US 11,568,602 B2

United States Patent
Nakagami et al.

(10) Patent No.: US 11,568,602 B2
(45) Date of Patent: Jan. 31, 2023

(54) IMAGE PROCESSING APPARATUS AND METHOD USING POINT CLOUD GENERATION AND A SURFACE OF A MESH

(71) Applicant: SONY CORPORATION, Tokyo (JP)

(72) Inventors: Ohji Nakagami, Tokyo (JP); Koji Yano, Tokyo (JP); Satoru Kuma, Tokyo (JP); Tsuyoshi Kato, Kanagawa (JP); Hiroyuki Yasuda, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/278,497

(22) PCT Filed: Sep. 18, 2019

(86) PCT No.: PCT/JP2019/036469
§ 371 (c)(1),
(2) Date: Mar. 22, 2021

(87) PCT Pub. No.: WO2020/071114
PCT Pub. Date: Apr. 9, 2020

(65) Prior Publication Data
US 2022/0036654 A1 Feb. 3, 2022

(30) Foreign Application Priority Data

Oct. 2, 2018 (JP) .............................. JP2018-187482
Jun. 20, 2019 (JP) .............................. JP2019-114627

(51) Int. Cl.
*G06T 17/20* (2006.01)
*G06T 9/40* (2006.01)
(Continued)

(52) U.S. Cl.
CPC .............. *G06T 17/205* (2013.01); *G06T 9/00* (2013.01); *G06T 9/001* (2013.01); *G06T 9/40* (2013.01);
(Continued)

(58) Field of Classification Search
CPC ....... G06T 17/00; G06T 17/20; G06T 17/205; G06T 9/00; G06T 9/001; G06T 9/40;
(Continued)

(56) References Cited

U.S. PATENT DOCUMENTS 6,126,603 A * 10/2000 Hatfield .................... A61B 8/06
600/443
6,590,582 B1 * 7/2003 Eo ........................... G06T 15/30
345/623
(Continued)

FOREIGN PATENT DOCUMENTS

JP     H05-084638 A    4/1993
JP     2012-069762 A    4/2012
(Continued)

OTHER PUBLICATIONS

Bergé, Louis-Pierre, et al. "Generation and VR visualization of 3D point clouds for drone target validation assisted by an operator." 2016 8th Computer Science and Electronic Engineering (CEEC). IEEE, 2016. (Year: 2016).*
(Continued)

*Primary Examiner* — Daniel F Hajnik
(74) *Attorney, Agent, or Firm* — Paratus Law Group, PLLC

(57) ABSTRACT

There is provided an image processing apparatus and an image processing method that are capable of suppressing an increase in loads when a point cloud is generated from a mesh. Point cloud data is generated by positioning points at intersection points between a surface of a mesh and vectors each including, as a start origin, position coordinates corresponding to a specified resolution. For example, intersection determination is performed between the surface of the mesh and each of the vectors, and in a case where the surface and the vector are determined to intersect each other, the coordinates of the intersection point are calculated. The present
(Continued)

disclosure can be applied to an image processing apparatus, electronic equipment, an image processing method, a program, or the like.

16 Claims, 20 Drawing Sheets

(51) Int. Cl.
    *G06T 9/00*        (2006.01)
    *G06T 17/00*      (2006.01)
    *H04N 19/70*     (2014.01)

(52) U.S. Cl.
    CPC .............. *G06T 17/00* (2013.01); *G06T 17/20* (2013.01); *H04N 19/70* (2014.11); *G06T 2210/08* (2013.01); *G06T 2210/12* (2013.01); *G06T 2210/21* (2013.01); *G06T 2210/56* (2013.01)

(58) Field of Classification Search
    CPC ............ G06T 2210/08; G06T 2210/12; H04N 19/597; H04N 19/70; H04N 19/96
    See application file for complete search history.

(56) References Cited

U.S. PATENT DOCUMENTS

| | | | |
|---|---|---|---|
| 8,502,818 B1* | 8/2013 | Mueller-Fischer | G06T 17/20 345/420 |
| 10,825,244 B1* | 11/2020 | Vorobyov | G06F 16/2219 |
| 2007/0206006 A1* | 9/2007 | Lee | G06T 17/005 345/420 |
| 2008/0133632 A1* | 6/2008 | Kim | G06V 10/7515 708/422 |
| 2011/0029329 A1* | 2/2011 | Schweizer | G16H 20/40 705/3 |
| 2013/0169638 A1* | 7/2013 | Carbonera | G06T 17/10 345/419 |
| 2014/0300595 A1* | 10/2014 | Bakalash | G06T 15/06 345/419 |
| 2016/0125577 A1* | 5/2016 | Wu | G06V 10/42 382/195 |
| 2017/0109462 A1* | 4/2017 | Palka | G06F 30/20 |
| 2017/0206231 A1* | 7/2017 | Binder | G06T 15/06 |
| 2017/0330367 A1* | 11/2017 | Chang | G06T 15/60 |
| 2018/0240281 A1 | 8/2018 | Vincelette | |
| 2018/0268570 A1 | 9/2018 | Budagavi et al. | |

FOREIGN PATENT DOCUMENTS

| | | |
|---|---|---|
| JP | 2014-002696 A | 1/2014 |
| JP | 2016-184245 A | 10/2016 |
| WO | WO 03/031005 A2 | 4/2003 |

OTHER PUBLICATIONS

Mekuria et al., Design, Implementation and Evaluation of a Point Cloud Codec for Tele-Immersive Video, IEEE Transactions on Circuits and Systems for Video Technology, Jan. 2016, pp. 1-14, IEEE.

Nakagami et al., Second Working Draft for PCC Categories 1,3, International Organization for Standardization, ISO/IEC JTC 1/SC 29/WG 11, Coding of Moving Pictures and Audio, Apr. 2018, pp. i-39, San Diego, US.

Mammou et al., PCC Test Model Category 13 v3, International Organisation for Standardisation ISO/IEC JTC1/SC29/WG11, Jul. 2018, pp. 1-18, Ljubljana, Slovenia.

Chou et al., Point Cloud Compression Test Model for Category 1 (November 23 version), International Organisation for Standardisation ISO/IEC JTC1/SC29/WG11, Oct. 2017, pp. 1-18, Macau.

Schwarz et al., Emerging MPEG Standards for Point Cloud Compression, IEEE Journal on Emerging and Selected Topics in Circuits and Systems, Mar. 2019, pp. 133-148, vol. 9, No. 1, IEEE.

\* cited by examiner

FIG. 1 -- Prior Art --

IMAGE PROCESSING APPARATUS AND METHOD USING POINT CLOUD GENERATION AND A SURFACE OF A MESH

CROSS REFERENCE TO PRIOR APPLICATION

This application is a National Stage Patent Application of PCT International Patent Application No. PCT/JP2019/036469 (filed on Sep. 18, 2019) under 35 U.S.C. § 371, which claims priority to Japanese Patent Application Nos. 2018-187482 (filed on Oct. 2, 2018) and 2019-114627 (filed on Jun. 20, 2019) which are all hereby incorporated by reference in their entirety.

TECHNICAL FIELD

The present disclosure relates to an image processing apparatus and an image processing method, and in particular to an image processing apparatus and an image processing method that are capable of suppressing an increase in loads when a point cloud is generated from a mesh.

BACKGROUND ART

In the related art, for example, coding with an Octree is available as a method for coding 3D data representative of a three-dimensional structure such as a point cloud (for example, see NPL 1).

In recent years, there has been a proposal that, after a target 3D object is voxelized, coding is performed by using a combination of Octree coding and mesh coding (Triangle soup) (see, for example, NPL 2).

CITATION LIST

Non Patent Literature

[NPL 1]
R. Mekuria, Student Member IEEE, K. Blom, P. Cesar., Member, IEEE, "Design, Implementation and Evaluation of a Point Cloud Codec for Tele-Immersive Video," tcsvt_paper_submitted_february.pdf

[NPL 2]
Ohji Nakagami, Phil Chou, Maja Krivokuca, Khaled Mammou, Robert Cohen, Vladyslav Zakharchenko, Gaelle Martin-Cocher, "Second Working Draft for PCC Categories 1, 3," ISO/IEC JTC1/SC29/WG11, MPEG 2018/N17533, April 2018, San Diego, US

SUMMARY

Technical Problem

However, in known methods, when a point cloud is generated from the mesh, points are densely sampled on surfaces of the mesh to generate a high-density point cloud, and subsequently, the point cloud is resampled into voxel data with a resolution comparable with the resolution of input. This leads to high throughput and a large amount of data to be processed, and loads may be increased when the point cloud is generated from the mesh.

In view of such circumstances, an object of the present disclosure is to enable suppression of an increase in loads when the point cloud is generated from the mesh.

Solution to Problem

An image processing apparatus according to an aspect of the present technique is an image processing apparatus including a point cloud generating section that generates point cloud data by positioning a point at an intersection point between a surface of a mesh and a vector including, as a start origin, position coordinates corresponding to a specified resolution.

An image processing method according to an aspect of the present technique is an image processing method including generating point cloud data by positioning a point at an intersection point between a surface of a mesh and a vector including, as a start origin, position coordinates corresponding to a specified resolution.

In the image processing apparatus and the image processing method according to the aspect of the present technique, the point cloud data is generated by positioning the point at the intersection point between the surface of the mesh and the vector including, as the start origin, the position coordinates corresponding to the specified resolution.

DESCRIPTION OF EMBODIMENTS

Figure 1:
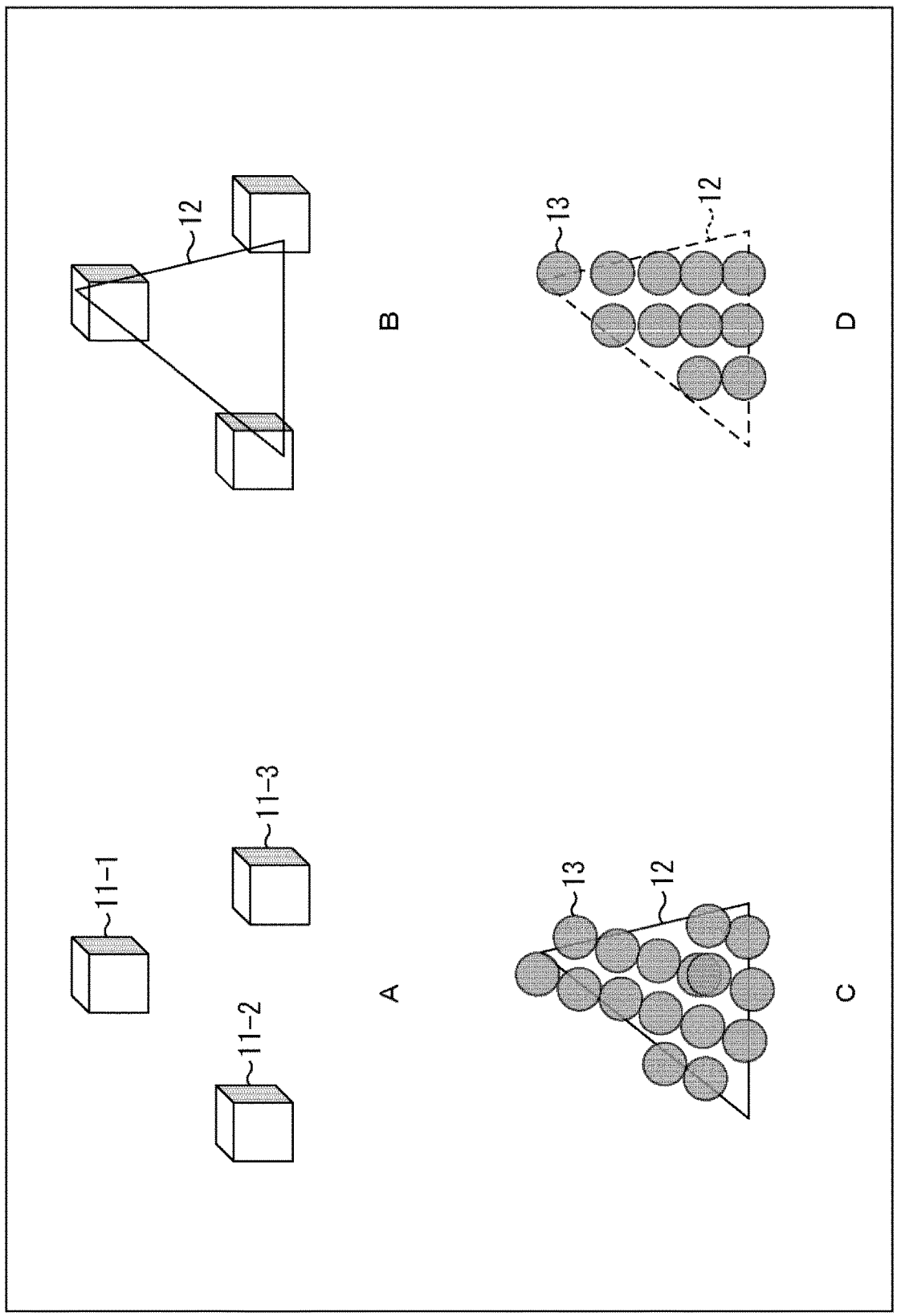
FIG. 1 illustrates diagrams of processing for generating a point cloud from a mesh.

Modes for carrying out the present disclosure (hereinafter referred to as embodiments) will be described below. Note that the description is given in the following order.

1. Generation of Point Cloud
2. First Embodiment (Point Cloud Generating Apparatus)
3. Second Embodiment (Decoding Apparatus)
4. Third Embodiment (Coding Apparatus)
5. Fourth Embodiment (Making Triangle Soup Scalable)
6. Supplementary Feature 1. Generation of Point Cloud Documents and the Like Supporting Technical Contents and Terms The scope disclosed in the present disclosure includes, as well as contents described in the embodiments, contents disclosed in the following non-patent literature that were known at the time of filing the application.
NPL 1: (described above)
NPL 2: (described above)
NPL 3: TELECOMMUNICATION STANDARDIZATION SECTOR OF ITU (International Telecommunication Union), "Advanced video coding for generic audiovisual services," H.264, April 2017
NPL 4: TELECOMMUNICATION STANDARDIZATION SECTOR OF ITU (International Telecommunication Union), "High efficiency video coding," H.265, December 2016
NPL 5: Jianle Chen, Elena Alshina, Gary J. Sullivan, Jens-Rainer, Jill Boyce, "Algorithm Description of Joint Exploration Test Model 4," JVET-G1001_v1, Joint Video Exploration Team (JVET) of ITU-T SG 16 WP 3 and ISO/IEC JTC 1/SC 29/WG 117th Meeting: Torino, IT, 13-21 Jul. 2017

In other words, the contents described in the non-patent literature listed above constitute grounds for determination of support requirements. For example, a Quad-Tree Block Structure described in NPL 4 and a QTBT (Quad Tree Plus Binary Tree) Block Structure described in NPL 5 are intended to be within the disclosure range of the present technique and to satisfy support requirements in claims even in a case where the embodiments include no description of the structures. Similarly, technical terms such as parsing, syntax, and semantics are intended to be within the disclosure range of the present technique and to satisfy support requirements in claims even in a case where the embodiments includes no description of the terms.
<Point Cloud>

In the related art, 3D data such as a point cloud and a mesh has been available. Specifically, the point cloud represents a three-dimensional structure by using position information, attribute information, and the like regarding a point group, and the mesh includes vertexes, edges, and surfaces and defines a three-dimensional shape by using polygonal representation.

For example, in a case of the point cloud, a three-dimensional structure (an object in a three-dimensional shape) is represented as a set of a large number of points (point group). In other words, the data in the point cloud (hereinafter also referred to as point cloud data) includes position information and attribute information (for example, colors and the like) regarding each of the points of the point group. Thus, the data structure is relatively simple, and a sufficiently large number of points are used to allow an optional three-dimensional structure to be represented with a sufficient accuracy.
<Quantization of Position Information Using Voxels>

Such point cloud data involves a relatively large amount of data, and thus, a coding method using voxels has been contrived for compression of the amount of data resulting from coding and the like. The voxels are three-dimensional regions for quantization of position information regarding an object to be coded.

In other words, a three-dimensional region containing a point cloud is split into small three-dimensional regions referred to as voxels, and for each of the voxels, whether or not points are contained in the voxel is indicated. This causes the position of each point to be quantized in units of voxels. Consequently, by converting point cloud data into such data regarding voxels (also referred to as voxel data), an increase in the amount of information can be suppressed (typically the amount of information can be reduced).
<Octree>

Further, construction of an Octree using such voxel data has been contrived. The Octree corresponds to a tree structure into which the voxel data is formed. The value of each bit in the lowermost node of the Octree indicates whether or not points are present in each voxel. For example, the value "1" indicates a voxel containing points, and the value "0" indicates a voxel containing no points. In the Octree, one node corresponds to eight voxels. In other words, each node of the Octree includes 8-bit data, and the 8 bits indicate whether or not points are present in the eight voxels.

An upper node in the Octree indicates whether or not points are present in one region into which eight voxels corresponding to the lower nodes belonging to the upper node are organized. In other words, organizing information regarding the voxels for the lower nodes generates the upper node. Note that, in a case where nodes have a value of "0," that is, in a case where none of the corresponding eight voxels contain points, the nodes are deleted.

This allows construction of a tree structure (Octree) including nodes with a value not being "0." In other words, the Octree can indicate whether or not points are present in voxels with different resolutions. Consequently, in a case where voxel data is formed into an Octree and the Octree is coded, then, during decoding, voxel data with a variety of resolutions can be more easily restored. In other words, scalability of the voxels can be more easily achieved.

Additionally, omission of nodes with the value "0" as described above enables a reduction in the resolution of voxels in regions where no points are present, thus allowing further suppression of an increase in the amount of information (typically allowing a reduction in the amount of information).
<Combination of Octree and Mesh>

In recent years, there has been a proposal that, after a target 3D object is voxelized, coding is performed by using a combination of Octree coding and mesh coding (Triangle soup), as described in, for example, NPL 2.

For example, as illustrated in A of FIG. 1, Octree data is decoded to generate voxel data. In the example in A of FIG. 1, a voxel 11-1, a voxel 11-2, and a voxel 11-3 are generated.

Then, as illustrated in, for example, B of FIG. 1, a mesh shape (that is, a surface of the mesh) is restored from the voxel data. In the example in B of FIG. 1, a surface 12 of the mesh is restored on the basis of the voxel 11-1, the voxel 11-2, and the voxel 11-3.

Then, as illustrated in, for example, C of FIG. 1, points 13 are positioned in the surface 12 of the mesh with a resolution of 1/(2*blockwidth). Note that blockwidth indicates the longest side of a bounding box including a mesh.

Then, as illustrated in, for example, D of FIG. 1, the points 13 are re-voxelized with a specified resolution d. At that time, mesh data (surface 12 and the like) is removed. In other words, when point cloud data with a desired resolution is generated from mesh data, sampling is performed so as to reduce the resolution of the points 13 (the number of points) temporarily sampled with a high resolution.

However, such a method needs to perform sampling twice, involving redundant processing. Additionally, a high-density point cloud is sampled, leading to an increased amount of data. Thus, loads may be increased when a point cloud is generated from the mesh. Consequently, a processing time may be extended, and the use of resources such as memories may be increased.

<Control of Resolution of Point Cloud>

Thus, by utilizing the fact in which an output point cloud has the same resolution as the resolution of a voxelized input point cloud, the number of voxel determinations is limited to allow a point cloud to be generated at high speed.

More specifically, point cloud data is generated by positioning points at intersection points between a surface of a mesh and vectors each including, as a start origin, position coordinates corresponding to a specified resolution.

For example, an image processing apparatus includes a point cloud generating section that generates point cloud data by positioning points at intersection points between a surface of a mesh and vectors each including, as a start origin, position coordinates corresponding to a specified resolution.

This allows voxel data equivalent to an input resolution to be generated from a mesh by a single step of processing. Consequently, a possible increase in loads can be suppressed when a point cloud is generated from a mesh. Thus, an extended processing time and an increased use of resources such as memories can be suppressed. Typically, the processing time can be shortened, and the use of resources such as memories can be reduced. Additionally, a point cloud can be generated at higher speed.

<Derivation of Point Cloud>

Figure 2:
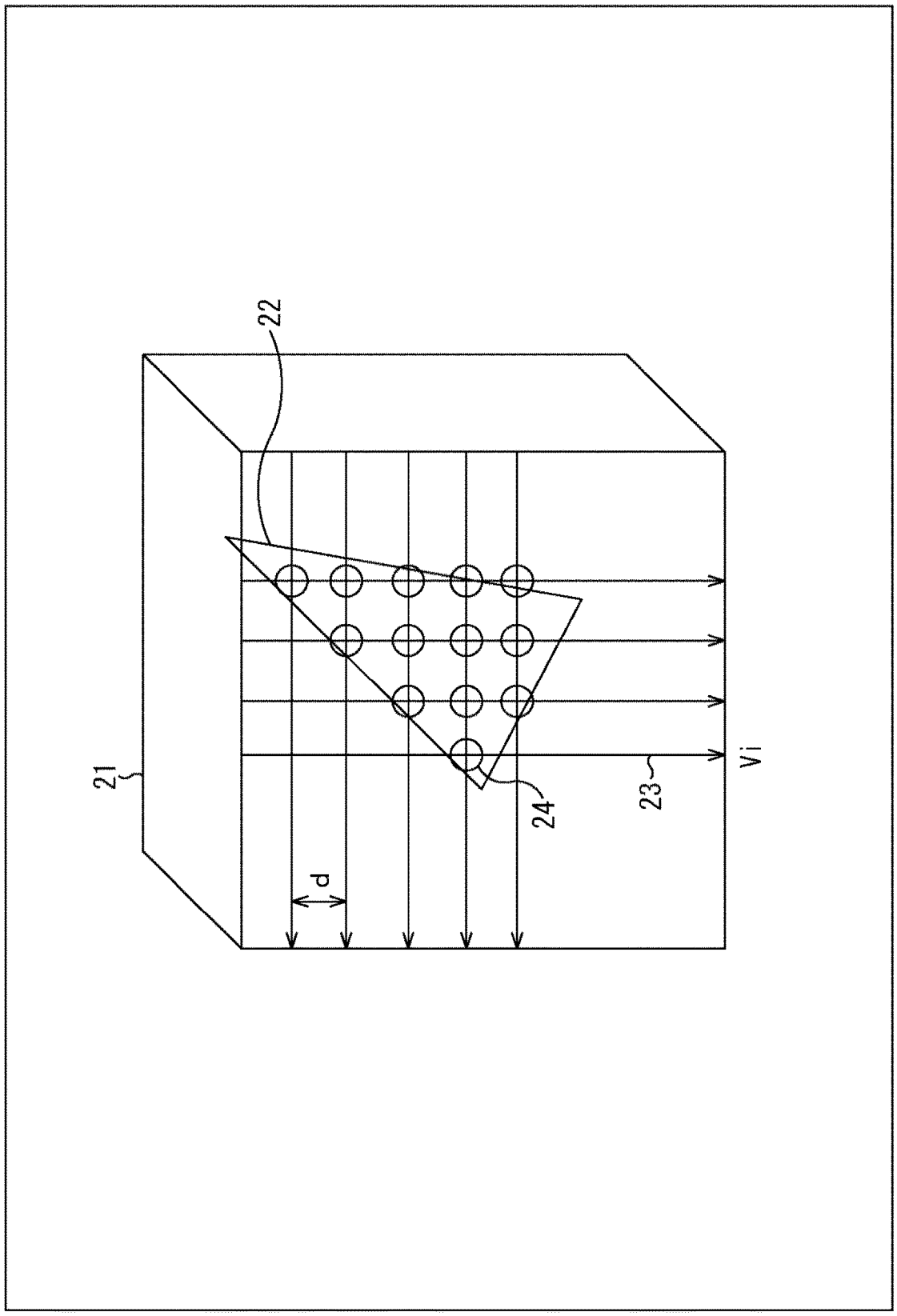
FIG. 2 is a diagram illustrating processing for generating the point cloud from the mesh.

Next, a method for deriving a point cloud will be described more specifically. First, as illustrated in FIG. 2, vectors Vi that have the same direction and length as those of the sides of a bounding box including data to be coded are generated at an interval k*d. In FIG. 2, for a surface 22 of a mesh present in the bounding box 21, the vectors Vi as illustrated by arrows 23 are set. "d" denotes a quantization size used when the bounding box is voxelized. "k" is any natural number. In other words, the vectors Vi are set each of which includes, as a start origin, position coordinates corresponding to the specified resolution.

Then, intersection determination is performed between the decoded surface 22 of the mesh (that is, a triangular mesh) and the set vectors Vi (arrow 23). In a case where the vectors Vi intersect the triangular surface 22, the coordinate values of intersection points 24 between the vectors Vi and the triangular surface 22 are calculated.

Note that, as the directions of the vectors Vi, two directions corresponding to positive and negative directions can be set for each of an x-direction, a y-direction, and a z-direction that are perpendicular to one another (directions parallel to the respective sides of the bounding box). In other words, intersection determination may be performed on the respective vectors Vi extending in the six types of directions. In such a manner, intersection determination is performed in more directions, allowing intersection points to be more reliably detected.

Note that the start point of each of the vectors Vi may be limited within the range of three vertexes of a triangular mesh. This enables a reduction in the number of vectors Vi to be processed, allowing suppression of a possible increase in loads (for example, allowing processing to be executed at higher speed).

Additionally, as auxiliary processing, in a case where the coordinate values of intersection points overlap between different vectors or meshes, all overlapping points may be deleted except one. Removing overlapping points in such a manner allows an increase in unnecessary processing and in loads to be suppressed (for example, enables faster processing).

Additionally, as auxiliary processing, in a case where the coordinate values of an intersection point are outside the bounding box, clip processing may be used to clip (move) the position of the intersection point into the bounding box. Alternatively, the intersection point may be deleted.

Points with coordinate values determined as described above are output as decode results. In other words, points are positioned at the determined coordinate values. This allows voxel data equivalent to an input resolution to be generated from a mesh by a single step of processing. Consequently, a possible increase in loads can be suppressed when a point cloud is generated from a mesh.

<Intersection Determination and Calculation of Coordinate Values>

Figure 3:
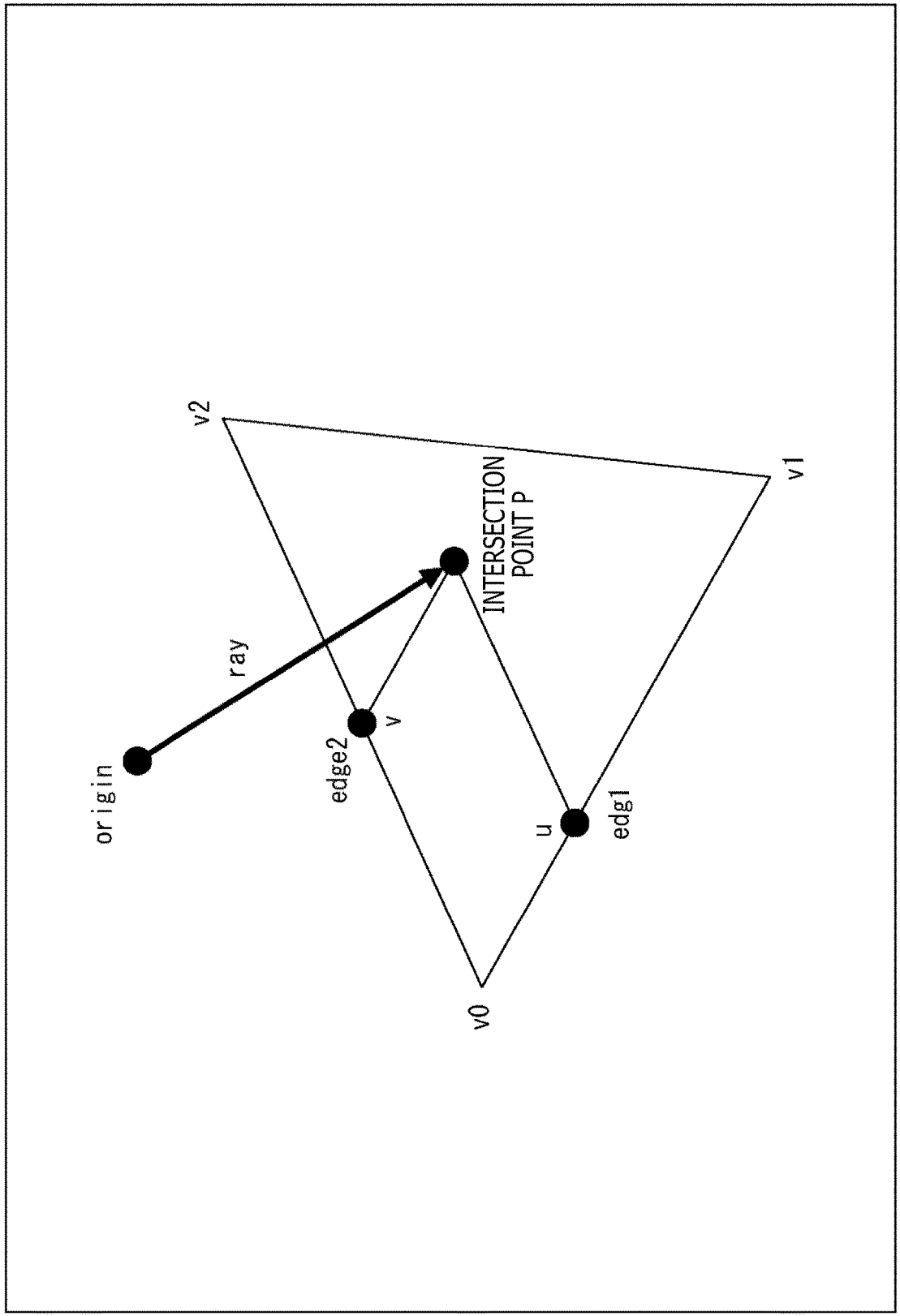
FIG. 3 is a diagram illustrating an example of a manner in which intersection points are calculated.

Note that methods for intersection determination and calculation of the coordinate values are optional. For example, Cramer's rule may be used for determination as illustrated in FIG. 3. For example, assuming that "P" denotes the coordinates of an intersection point, "origin" denotes the coordinates of ray, "ray" denotes a direction vector, and "t" denotes a scalar value, an intersection point passing through ray is represented as follows by using a linear expression.

$$P = \text{origin} + \text{ray} * t$$

Additionally, "v0" denotes vertex coordinates of a triangle, "edge1" denotes a vector obtained by subtracting coordinates v0 from coordinates v1, and "edge2" denotes a vector similarly obtained by subtracting coordinates v0 from coordinates v2. A point P is represented by u (scalar value) from v0 in a vector edge1 direction, and an intersection point on a triangle is expressed as follows by using the vectors of the edges.

$$P = v0 + \text{edge1} * u + \text{edge2} * v$$

Joining the two equations results in simultaneous equations.

$$\text{origin} + \text{ray} * t = v0 + \text{edge1} * u + \text{edge2} * v$$

The equations can be organized and expressed as follows.

$$\text{edge1} * u + \text{edge2} - v \cdot \text{ray} * t = \text{origin} \cdot v0$$

As described above, a simultaneous linear equation with three unknowns is obtained and can thus be automatically calculated as a determinant by using the Cramer's rule.

2. First Embodiment

<Point Cloud Generating Apparatus>

Figure 4:
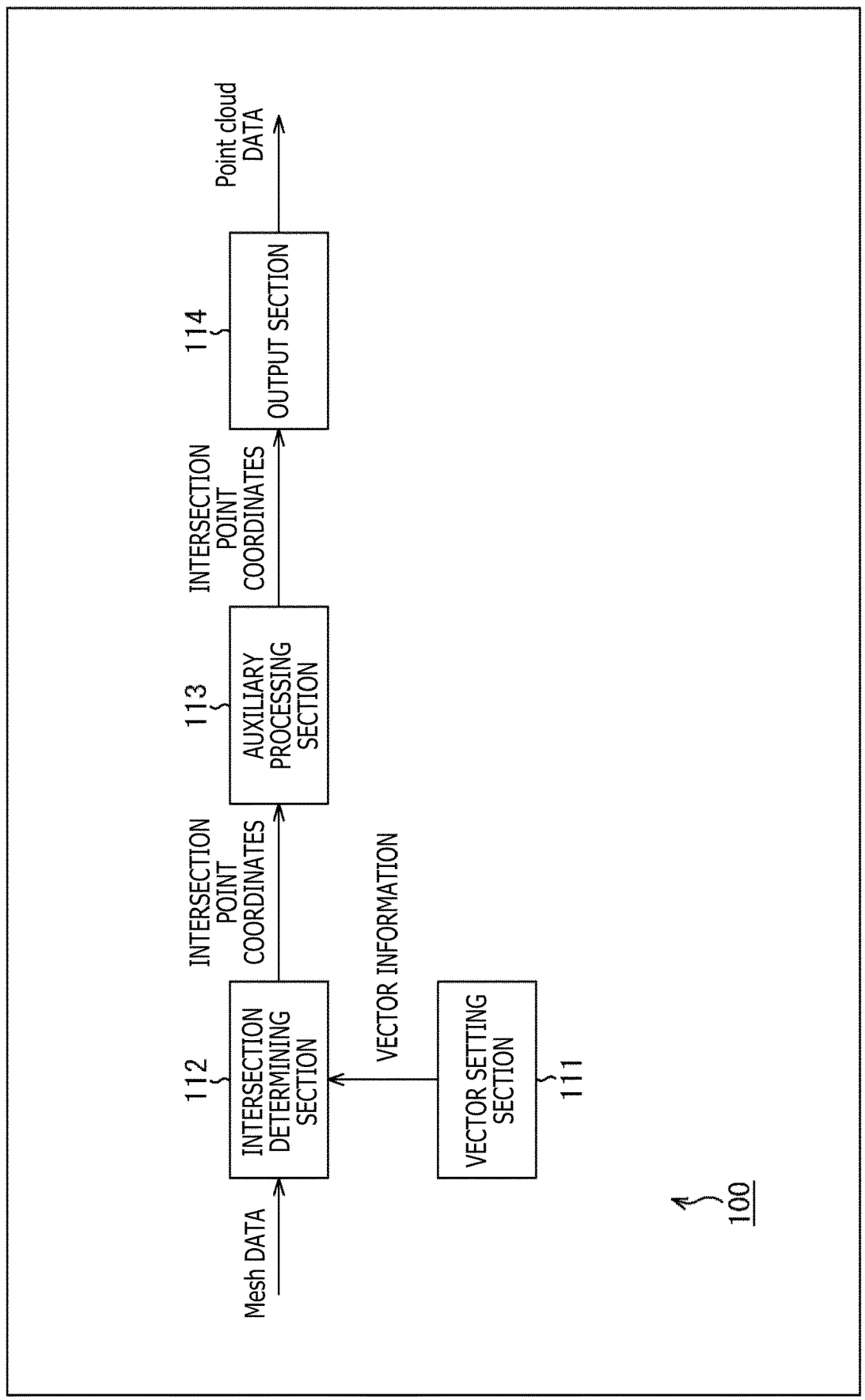
FIG. 4 is a block diagram illustrating an example of a main configuration of a point cloud generating apparatus.

Next, a configuration will be described that implements processing as described above. FIG. 4 is a block diagram illustrating an example of a configuration of a point cloud generating apparatus as an aspect of an image processing apparatus to which the present technique is applied. A point cloud generating apparatus 100 illustrated in FIG. 4 is an apparatus that generates a point cloud from a mesh as described in <1. Generation of Point Cloud>.

Note that FIG. 4 illustrates main components such as processing sections and data flows and that not all the components of the point cloud generating apparatus 100 are illustrated in FIG. 4. In other words, in the point cloud generating apparatus 100, processing sections may be present that are not illustrated as blocks in FIG. 4, or processing or data flows may be present that are not illustrated as arrows or the like in FIG. 4.

As illustrated in FIG. 4, the point cloud generating apparatus 100 includes a vector setting section 111, an intersection determining section 112, an auxiliary processing section 113, and an output section 114.

The vector setting section 111 sets (generates) vectors Vi for intersection determination as described above, for example, in <Derivation of Point Cloud>. The vectors Vi have the same direction and the same length as those of sides of a bounding box including data to be coded, as described above. The vector setting section 111 feeds the intersection determining section 112 with vector information indicating the set vectors Vi.

The intersection determining section 112 acquires mesh data input to the point cloud generating apparatus 100 and further acquires vector information fed from the vector setting section 111. The intersection determining section 112 performs intersection determination between a surface of a mesh indicated by the acquired mesh data and the vectors Vi indicated by the vector information, as described above, for example, in <Derivation of Point Cloud>, <Intersection Determination and Calculation of Coordinate Values>, and the like. In a case that intersection points are detected, the intersection determining section 112 calculates the coordinate values of the intersection points. The intersection determining section 112 feeds the calculated coordinate values of the intersection points (intersection point coordinates) to the auxiliary processing section 113.

The auxiliary processing section 113 acquires the intersection point coordinates fed from the intersection determining section 112 and executes auxiliary processing on the intersection points as described above, for example, in <Derivation of Point Cloud>. The auxiliary processing section 113 feeds the intersection point coordinates at which the auxiliary processing has been executed, to the output section 114, as necessary.

The output section 114 outputs the intersection point coordinates fed from the auxiliary processing section 113, to the outside of the point cloud generating apparatus 100 as (position information in) point cloud data. In other words, point cloud data with points positioned at derived intersection point coordinates is generated and output.

Note that the processing sections (vector setting section 111 to output section 114) have optional configurations. For example, each of the processing sections may include a logic circuit that implements the above-described processing. Additionally, each processing section may, for example, include a CPU (Central Processing section), a ROM (Read Only Memory), a RAM (Random Access Memory), and the like and use the CPU and the memories to execute a program, implementing the above-described processing. Needless to say, each processing section may have both of the above-described configurations to implement a part of the above-described processing by using a logic circuit, while implementing the remaining part of the processing by using a program. The processing sections may be configured independently of one another. For example, some processing sections may implement a part of the above-described processing by using a logic circuit, other processing sections may implement the above-described processing by executing a program, and the other processing sections may implement the above-described processing by using both a logic circuit and execution of a program.

Such a configuration allows the point cloud generating apparatus 100 to produce effects as described in <1. Generation of Point Cloud>. For example, voxel data equivalent to an input resolution can be generated from a mesh by executing a single step of processing.

Thus, an increase in loads involved in generation of point cloud data can be suppressed. Consequently, for example, point cloud data can be generated at higher speed. Additionally, for example, manufacturing costs of the point cloud generating apparatus 100 can be reduced.

<Flow of Point Cloud Generation Processing>

Figure 5:
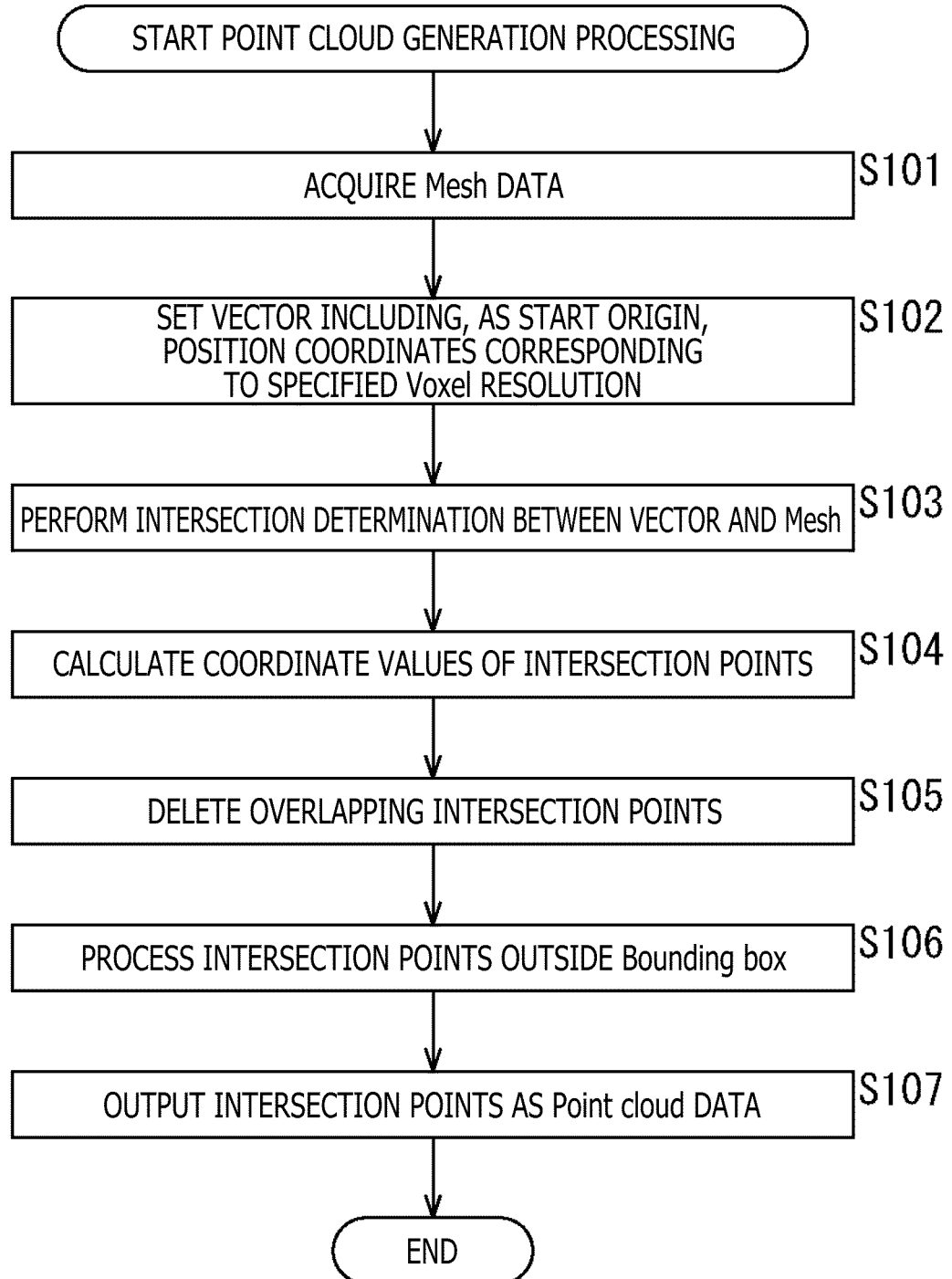
FIG. 5 is a flowchart illustrating an example of a flow of point cloud generation processing.

Next, an example of a flow of point cloud generation processing executed by the point cloud generating apparatus 100 will be described with reference to a flowchart in FIG. 5.

When the point cloud generation processing is started, the intersection determining section 112 acquires mesh data in step S101.

In step S102, the vector setting section 111 sets the vectors Vi each including, as a start origin, position coordinates corresponding to a specified voxel resolution (the vector having the same direction and the same length as those of each side of a bounding box including data to be coded).

In step S103, the intersection determining section 112 performs intersection determination between the vectors Vi set in step S102 and a surface (triangle) of a mesh indicated by the mesh data acquired in step S101.

In step S104, the intersection determining section 112 calculates the coordinates of intersection points detected in step S103.

In step S105, the auxiliary processing section 113 deletes overlapping intersection points except one.

In step S106, the auxiliary processing section 113 processes intersection points outside the bounding box (for example, executes clip processing on the intersection points or deletes the intersection points).

In step S107, the output section 114 outputs, as point cloud data (position information), the coordinates of the intersection points determined as described above.

When step S107 of processing ends, the point cloud generation processing ends.

Note that the respective steps of processing described above are executed as is the case with the example described above in <1. Generation of Point Cloud>. Thus, by executing the respective steps of processing described above, the point cloud generating apparatus 100 can produce effects as described in <1. Generation of Point Cloud>. For example, voxel data equivalent to an input resolution can be generated from a mesh by executing a single step of processing. Thus, an increase in loads involved in generation of point cloud data can be suppressed. Consequently, for example, point cloud data can be generated at higher speed.

Additionally, for example, the manufacturing costs of the point cloud generating apparatus 100 can be reduced.

<Reduction of Intersection Points on Surface Relative to Center>

Figure 6:
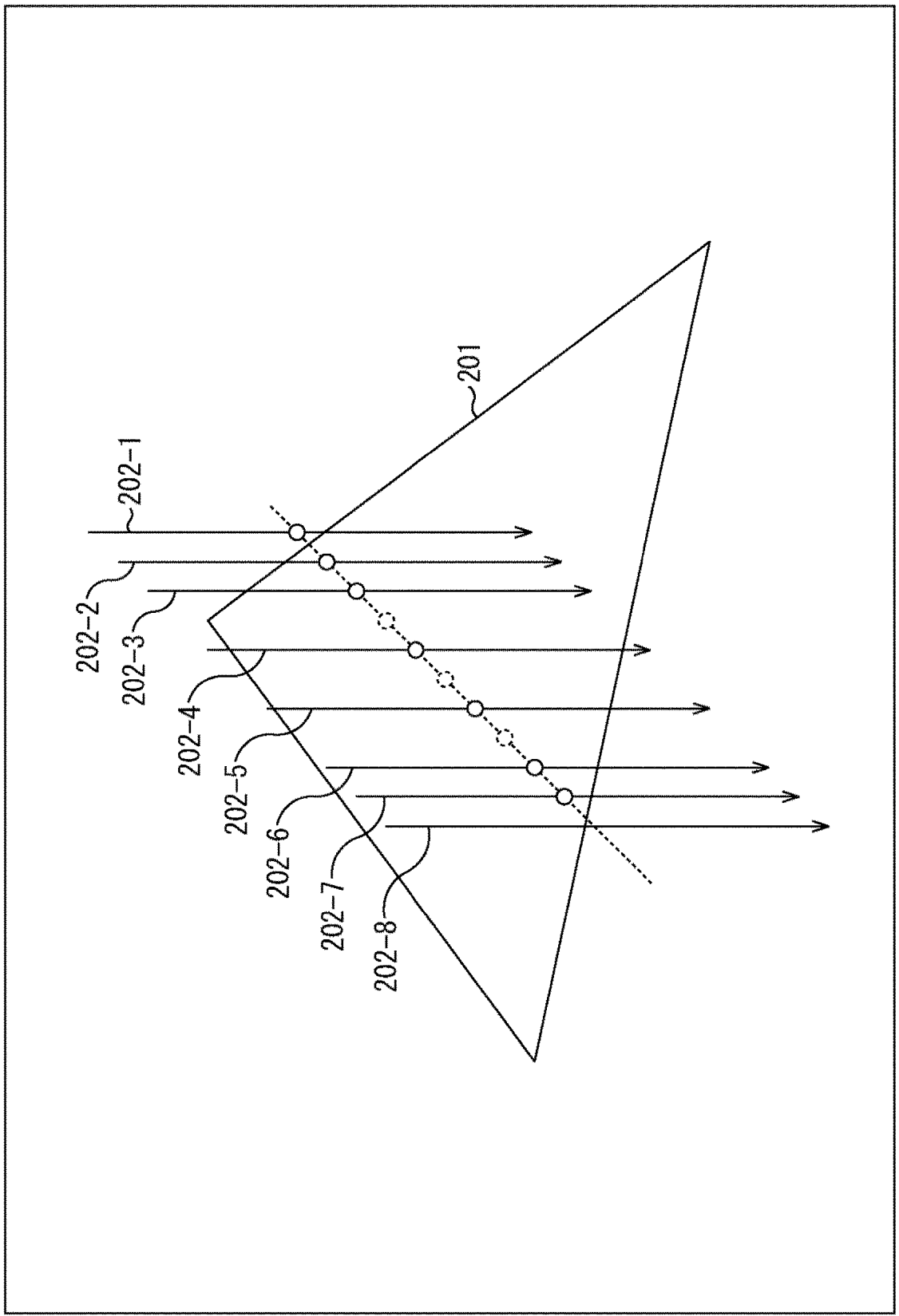
FIG. 6 is a diagram illustrating an example of a manner in which intersection points are derived.

Note that, in the intersection determination as described above, the intersection determination may be performed on a portion of a surface relative to the center by using sparser vectors Vi than that used in the case of the intersection determination performed on the ends of the surface. For example, as is the case with an example in FIG. 6, intersection determination may be performed on a surface 201 by using vectors Vi 202-1 to 202-8. In this example, the intervals between the vectors Vi 202-1 to 202-8 are set such that the intervals between the vectors Vi 202-1 to 202-3 and the intervals between the vectors Vi 202-6 to 202-8 are small. In other words, the intervals between the vectors Vi 202-3 to 202-6 are set larger than the intervals between the other vectors Vi. Specifically, the vectors Vi 202-1 to 202-3 and the vectors Vi 202-6 to 202-8, which are used to perform intersection determination on the ends of the surface 201, have intervals set smaller (the vectors are dense), whereas the vectors Vi 202-3 to 202-6, which are used to perform intersection determination on a portion of the surface 201 relative to the center, have intervals set larger (the vectors are sparse).

As described above, on a portion of the triangle relative to the center, collision detection is performed on the vectors Vi by intentionally using larger intervals (the intervals between the start origins are increased), enabling a reduction in the number of points generated on the portion of the triangle relative to the center. Consequently, an increase in the coding bit rate of attribute information (color information and the like) regarding the point cloud can be suppressed.

<Omission of Intersection Determination>

Figure 7:
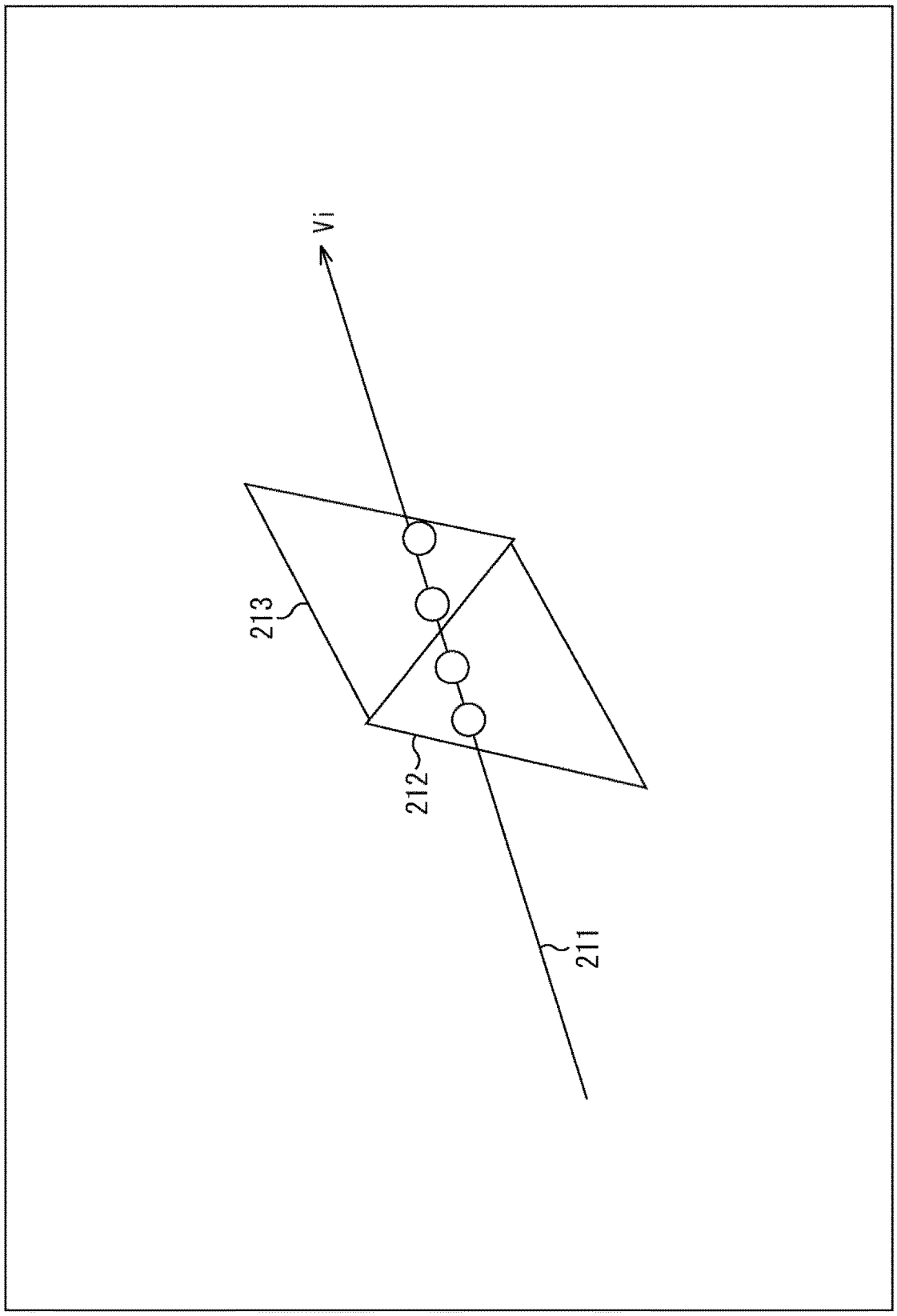
FIG. 7 is a diagram illustrating an example of a manner in which intersection points are derived.

Additionally, the coordinates on which intersection determination has been performed once may be prevented from being calculated again. For example, in a case where a plurality of surfaces (surface 212 and surface 213) of a mesh is present for one vector Vi 211 as illustrated in an example in FIG. 7, intersection determination is simultaneously performed on the one vector Vi 211 to allow processing to be executed at higher speed.

<Addition of Denoise Processing>

Figure 8:
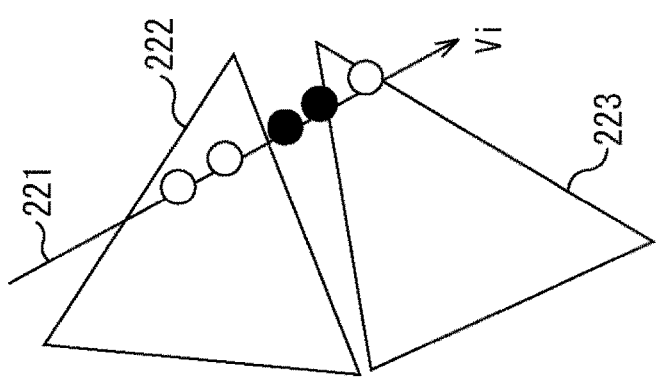
FIG. 8 is a diagram illustrating an example of a manner in which intersection points are derived.

Additionally, as illustrated in FIG. 8, in a case where one vector Vi 221 intersects a plurality of triangles (surface 222 and surface 223) and where a space is present between the triangles, points (in the figure, black points) may be generated in the space to fill the gap (denoise). This allows a more accurate point cloud to be generated. In other words, degradation of image quality of the display image can be suppressed (typically, the image quality can be improved).

<Parallelization of Processing>

Note that, for the intersection determination as described above, a plurality of steps of processing may be executed in parallel. For example, intersection determination for a plurality of vectors for one surface of a mesh may be processed in parallel (steps of processing may be executed in parallel). In other words, processing may be executed independently for each vector. This allows intersection determination to be performed at higher speed.

Additionally, for example, intersection determination may be performed on a plurality of surfaces for one vector in parallel (steps of processing may be executed in parallel). In other words, processing may be executed independently for each surface of the mesh. This allows intersection determination to be achieved at higher speed.

3. Second Embodiment

<Decoding Apparatus>

Figure 9:
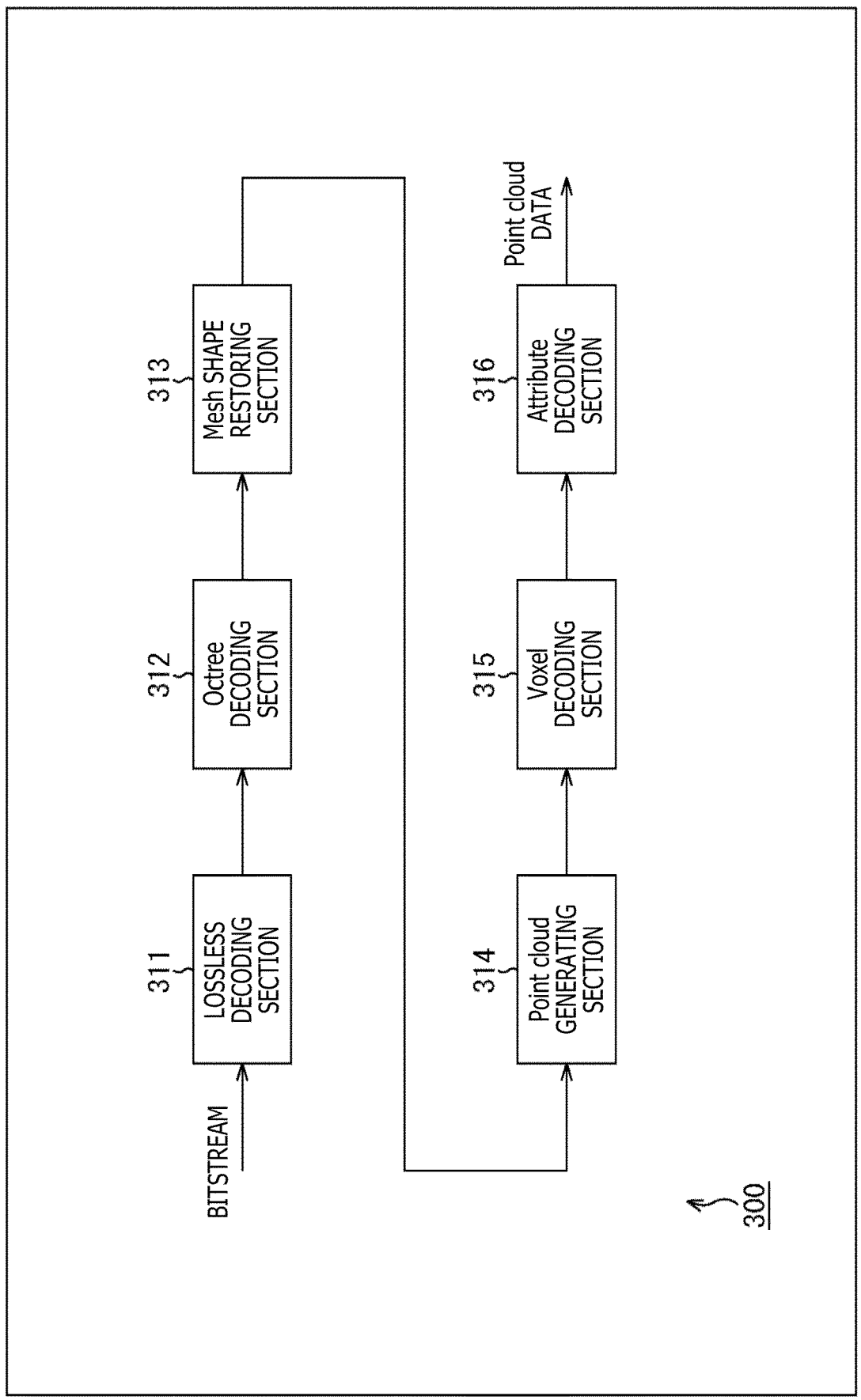
FIG. 9 is a block diagram illustrating an example of a main configuration of a decoding apparatus.

FIG. 9 is a block diagram illustrating an example of a configuration of a decoding apparatus as an aspect of an image processing apparatus to which the present technique is applied. A decoding apparatus 300 illustrated in FIG. 9 corresponds to a coding apparatus 500 in FIG. 11 described later and, for example, decodes a bitstream generated by the coding apparatus 500 to restore point cloud data.

Note that FIG. 9 illustrates main components such as processing sections and data flows and that not all the components of the decoding apparatus 300 are illustrated in FIG. 9. In other words, in the decoding apparatus 300, processing sections may be present that are not illustrated as blocks in FIG. 9, or processing or data flows may be present that are not illustrated as arrows or the like in FIG. 9.

As illustrated in FIG. 9, the decoding apparatus 300 includes a lossless decoding section 311, an Octree decoding section 312, a Mesh shape restoring section 313, a Point cloud generating section 314, and an Attribute decoding section 315.

The lossless decoding section 311 acquires a bitstream input to the decoding apparatus 300 and decodes the bitstream to generate Octree data. The lossless decoding section 311 feeds the Octree data to the Octree decoding section 312.

The Octree decoding section 312 acquires the Octree data fed from the lossless decoding section 311, constructs an Octree from the Octree data, and generates voxel data from the Octree. The Octree decoding section 312 feeds the generated voxel data to the Mesh shape restoring section 313.

The Mesh shape restoring section 313 uses the voxel data fed from the Octree decoding section 312 to restore a mesh shape. The Mesh shape restoring section 313 feeds generated mesh data to the Point cloud generating section 314.

The Point cloud generating section 314 generates point cloud data from the mesh data fed from the Mesh shape restoring section 313 and feeds the generated point cloud data to the Attribute decoding section 315. The Point cloud generating section 314 is configured similarly to the point cloud generating apparatus 100 (FIG. 4) and executes processing similar to the processing executed by the point cloud generating apparatus 100. Specifically, the Point cloud generating section 314 generates point cloud data from mesh data by using a method as described above in <1. Generation of Point Cloud> and <2. First Embodiment>.

Thus, the Point cloud generating section 314 can produce effects similar to the effects of the point cloud generating apparatus 100. For example, the Point cloud generating section 314 can generate, from a mesh, voxel data equivalent to an input resolution by executing a single step of processing. Thus, the Point cloud generating section 314 can suppress an increase in loads involved in generation of point cloud data. Consequently, the Point cloud generating section 314 can, for example, generate point cloud data at higher speed. Additionally, for example, the manufacturing costs of the Point cloud generating section 314 can be reduced.

The Attribute decoding section 315 executes processing related to decoding of attribute information. For example, the Attribute decoding section 315 decodes attribute information corresponding to the point cloud data fed from the Point cloud generating section 314. Then, the Attribute decoding section 315 includes the decoded attribute information in the point cloud data fed from the Point cloud generating section 314 and outputs the point cloud data to the outside of the decoding apparatus 300.

Note that these processing sections (lossless decoding section 311 to Attribute decoding section 315) have optional configurations. For example, each of the processing sections may include a logic circuit that implements the above-described processing. Additionally, each processing section may, for example, include a CPU, a ROM, a RAM, and the like and use the CPU and the memories to execute a program, implementing the above-described processing. Needless to say, each processing section may have both of the above-described configurations to implement a part of the above-described processing by using a logic circuit, while implementing the remaining part of the processing by using a program. The processing sections may be configured independently of one another. For example, some processing sections may implement a part of the above-described processing by using a logic circuit, other processing sections may implement the above-described processing by executing a program, and the other processing sections may implement the above-described processing by using both a logic circuit and execution of a program.

Such a configuration allows the decoding apparatus 300 to produce effects as described in <1. Generation of Point Cloud> and <2. First Embodiment>. For example, the decoding apparatus 300 can generate voxel data equivalent to an input resolution from a mesh by executing a single step of processing and can thus suppress an increase in loads involved in generation of point cloud data. Consequently, for example, the decoding apparatus 300 can generate point cloud data at higher speed. Additionally, for example, manufacturing costs of the decoding apparatus 300 can be reduced.

<Flow of Decoding Processing>

Next, an example of a flow of decoding processing executed by the decoding apparatus 300 will be described with reference to a flowchart in FIG. 10.

When decoding processing is started, in step S301, the lossless decoding section 311 acquires a bitstream.

In step S302, the lossless decoding section 311 performs lossless decoding on the bitstream acquired in step S301.

In step S303, the Octree decoding section 312 constructs an Octree and restores voxel data.

In step S304, the Mesh shape restoring section 313 restores a mesh shape from the voxel data restored in step S303.

In step S305, the Point cloud generating section 314 executes point cloud generation processing (FIG. 5) and uses a method as described above in <1. Generation of Point Cloud> and <2. First Embodiment> to generate a point cloud from the mesh shape restored in step S304.

In step S306, the Attribute decoding section 315 decodes attribute information.

In step S307, the Attribute decoding section 315 includes, in the point cloud data, the attribute information decoded in step S306 and outputs the point cloud data.

When step S307 of processing ends, the decoding processing ends.

By executing each step of processing as described above, the decoding apparatus 300 can produce effects as described in <1. Generation of Point Cloud> and <2. First Embodiment>.

4. Third Embodiment

<Coding Apparatus>

Figure 11:
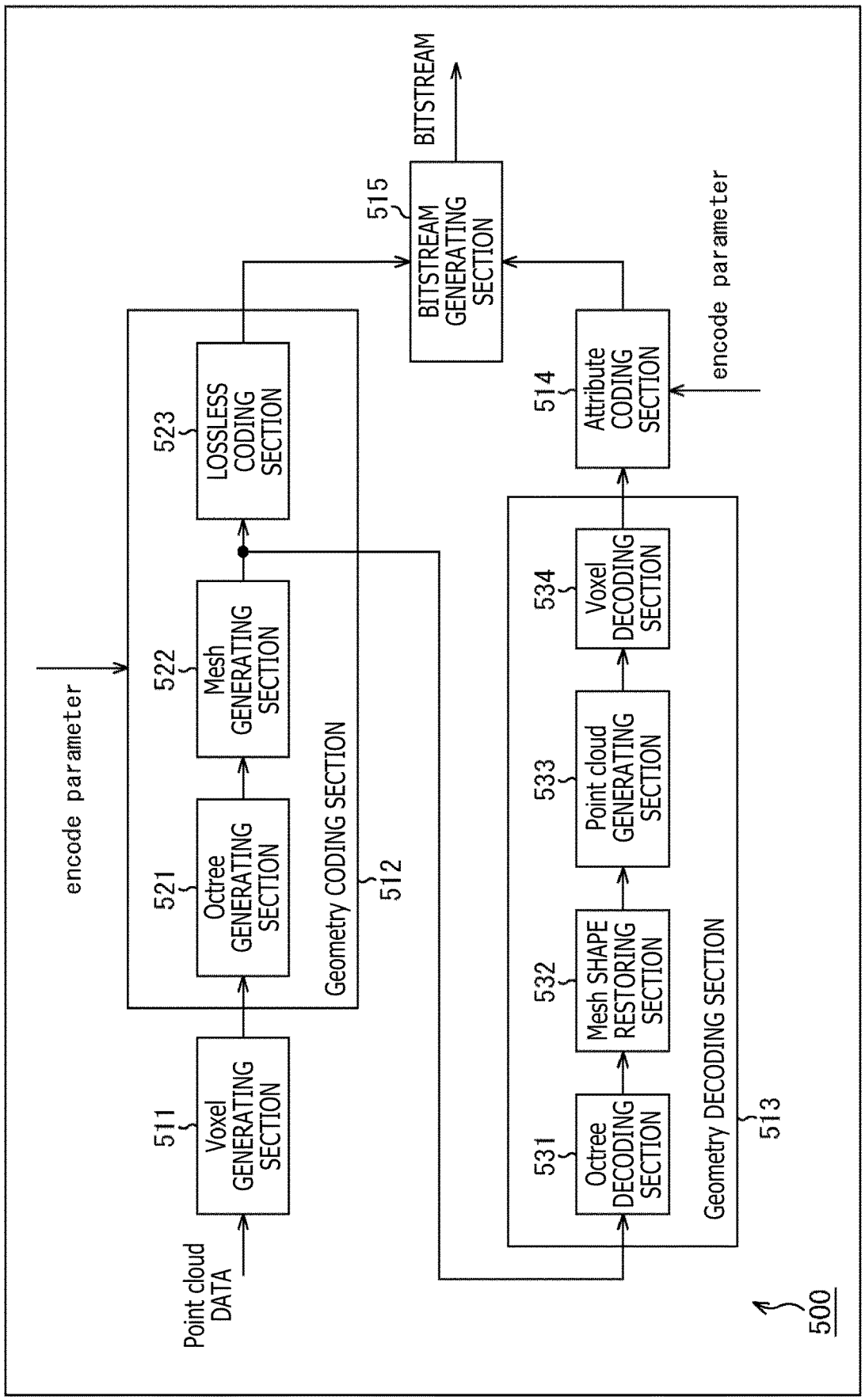
FIG. 11 is a block diagram illustrating an example of a main configuration of a coding apparatus.

FIG. 11 is a block diagram illustrating an example of a configuration of a coding apparatus as an aspect of an image processing apparatus to which the present technique is applied. The coding apparatus 500 illustrated in FIG. 11 is an apparatus that codes 3D data such as a point cloud by using voxels and Octrees.

Note that FIG. 11 illustrates main components such as processing sections and data flows and that not all the components of the coding apparatus 500 are illustrated in FIG. 11. In other words, in the coding apparatus 500, processing sections may be present that are not illustrated as blocks in FIG. 11, or processing or data flows may be present that are not illustrated as arrows or the like in FIG. 11. This also applies to other figures for describing the processing sections and the like in the coding apparatus 500.

The coding apparatus 500 illustrated in FIG. 11 includes a Voxel generating section 511, a Geometry coding section 512, a Geometry decoding section 513, an Attribute coding section 514, and a bitstream generating section 515.

The Voxel generating section 511 acquires point cloud data input to the coding apparatus 500, sets a bounding box for a region including the acquired point cloud data, and further splits the bounding box to set voxels, quantizing position information in the point cloud data. The Voxel generating section 511 feeds voxel data thus generated to the Geometry coding section 512.

The Geometry coding section 512 codes voxel data fed from the Voxel generating section 511 to code the position information regarding the point cloud. The Geometry coding section 512 feeds the bitstream generating section 515 with generated coded data of the position information regarding the point cloud. Additionally, the Geometry coding section 512 feeds the Geometry decoding section 513 with Octree data generated when the position information regarding the point cloud is coded.

The Geometry decoding section 513 decodes the Octree data to generate the position information regarding the point cloud. The Geometry decoding section 513 feeds the generated point cloud data (position information) to the Attribute coding section 514.

On the basis of input encode parameters, the Attribute coding section 514 codes attribute information corresponding to the point cloud data (position information). The Attribute coding section 514 feeds generated coded data of the attribute information to the bitstream generating section 515.

The bitstream generating section 515 generates a bitstream including the coded data of the position information fed from the Geometry coding section 512 and the coded data of the attribute information fed from the Attribute coding section 514, and outputs the bitstream to the outside of the coding apparatus 500.

<Geometry Coding Section>

The Geometry coding section 512 includes an Octree generating section 521, a Mesh generating section 522, and a lossless coding section 523.

The Octree generating section 521 uses voxel data fed from the Voxel generating section 511 to construct an Octree and generates Octree data. The Octree generating section 521 feeds the generated Octree data to the Mesh generating section 522.

The Mesh generating section 522 uses Octree data fed from the Octree generating section 521 to generate mesh data and feeds the mesh data to the lossless coding section 523. Additionally, the Mesh generating section 522 feeds the Octree data to the Geometry decoding section 513.

The lossless coding section 523 acquires mesh data fed from the Mesh generating section 522. Additionally, the lossless coding section 523 acquires an encode parameter input from the outside of the coding apparatus 500. The encode parameter is information designating the type of coding to be applied, and the encode parameter is input by a user operation or fed from an external apparatus or the like. The lossless coding section 523 codes mesh data by using a type designated by the encode parameter to generate coded data of position information. The lossless coding section 523 feeds the position information to the bitstream generating section 515.

<Geometry Decoding Section>

The Geometry decoding section 513 includes an Octree decoding section 531, a Mesh shape restoring section 532, and a Point cloud generating section 533.

The Octree decoding section 531 decodes the Octree data fed from the Geometry coding section 512 to generate voxel data. The Octree decoding section 531 feeds the generated voxel data to the Mesh shape restoring section 532.

The Mesh shape restoring section 532 uses the voxel data fed from the Octree decoding section 531 to restore a mesh shape, and feeds resultant mesh data to the Point cloud generating section 533.

The Point cloud generating section 533 generates point cloud data from mesh data fed from the Mesh shape restoring section 532, and feeds the generated point cloud data to the Attribute coding section 514. The Point cloud generating section 533 is configured similarly to the point cloud generating apparatus 100 (FIG. 4) and executes processing similar to the processing executed by the point cloud generating apparatus 100. Specifically, the Point cloud generating section 533 generates point cloud data from the mesh data by using a method as described in <1. Generation of Point Cloud> and <:2. First Embodiment>.

Thus, the Point cloud generating section 533 can produce effects similar to the effects of the point cloud generating apparatus 100. For example, the Point cloud generating section 533 can generate voxel data equivalent to an input resolution from a mesh by executing a single step of processing. Thus, the Point cloud generating section 533 can suppress an increase in loads involved in generation of point cloud data. Consequently, the Point cloud generating section 533 can, for example, generate point cloud data at higher speed. Additionally, for example, the manufacturing costs of the Point cloud generating section 533 can be reduced.

Note that these processing sections (Voxel generating section 511 to Attribute coding section 514, Octree generating section 521 to lossless coding section 523, and Octree decoding section 531 to Point cloud generating section 533) have optional configurations. For example, each of the processing sections may include a logic circuit that implements the above-described processing. Additionally, each processing section may, for example, include a CPU, a ROM, a RAM, and the like and use the CPU and the memories to execute a program, implementing the above-described processing. Needless to say, each processing section may have both of the above-described configurations to implement a part of the above-described processing by using a logic circuit, while implementing the remaining part of the processing by using a program. The processing sections may be configured independently of one another. For example, some processing sections may implement a part of the above-described processing by using a logic circuit, other processing sections may implement the above-described processing by executing a program, and the other processing sections may implement the above-described processing by using both a logic circuit and execution of a program.

Such a configuration allows the coding apparatus 500 to produce effects as described in <1. Generation of Point Cloud> and <2. First Embodiment>. For example, the coding apparatus 500 can generate voxel data equivalent to an input resolution from a mesh by executing a single step of processing, and can thus suppress an increase in loads involved in generation of point cloud data. Consequently, the coding apparatus 500 can, for example, generate a bitstream at higher speed. Additionally, for example, the manufacturing costs of the coding apparatus 500 can be reduced.

<Flow of Coding Processing>

Figure 12:
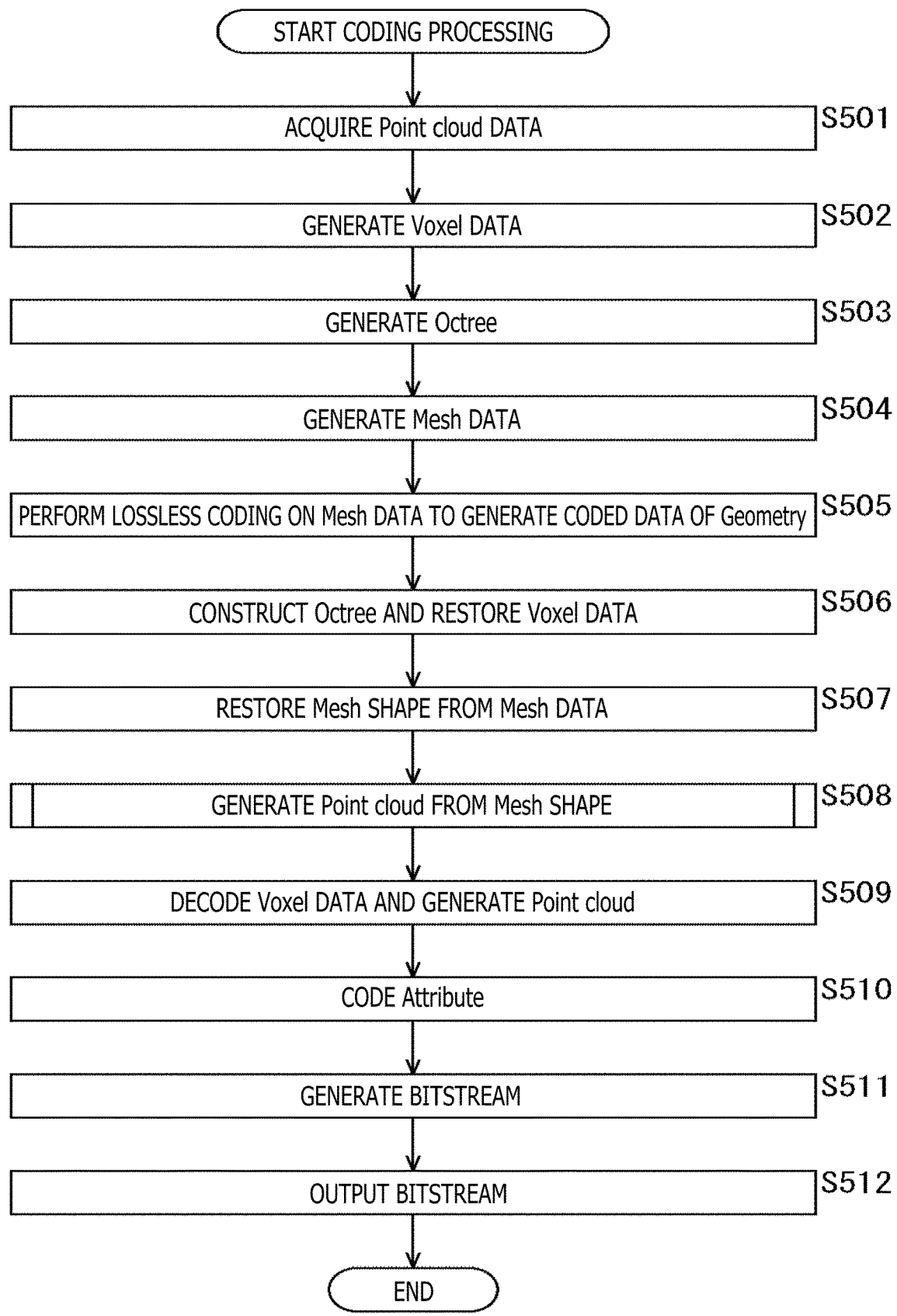
FIG. 12 is a flowchart illustrating an example of a flow of coding processing.

Next, an example of a flow of coding processing executed by the coding apparatus 500 will be described with reference to a flowchart in FIG. 12.

When coding processing is started, the Voxel generating section 511 acquires point cloud data in step S501.

In step S502, the Voxel generating section 511 uses the point cloud data to generate voxel data.

In step S503, the Octree generating section 521 uses the voxel data to construct an Octree and generates Octree data.

In step S504, the Mesh generating section 522 generates mesh data on the basis of the Octree data.

In step S505, the lossless coding section 523 performs lossless coding on the mesh data to generate coded data of position information regarding a point cloud.

In step S506, the Octree decoding section 531 uses the Octree data generated in step S503 to restore voxel data.

In step S507, the Mesh shape restoring section 532 restores a mesh shape from the voxel data.

In step S508, the Point cloud generating section 533 executes point cloud generation processing (FIG. 5) to generate point cloud data from the mesh shape by using a method as described in <1. Generation of Point Cloud> and <2. First Embodiment>.

In step S509, the Attribute coding section 514 uses the point cloud data to code attribute information.

In step S510, the bitstream generating section 515 generates a bitstream including the coded data of the position information generated in step S505 and the coded data of the attribute information generated in step S509.

In step S511, the bitstream generating section 515 outputs the bitstream to the outside of the coding apparatus 500.

When step S511 of processing ends, coding processing ends.

By executing each step of processing as described above, the coding apparatus 500 can produce effects as described in <1. Generation of Point Cloud> and <2. First Embodiment>.

5. Fourth Embodiment

<Making Triangle Soup Scalable>

In the above description, in a Triangle soup, point cloud data is generated by generating points at intersection points between a surface of a mesh and vectors each including, as a start origin, position coordinates corresponding to a specified voxel resolution. The present invention is not limited to this configuration, and point cloud data may be generated from a mesh with an optional resolution.

Figure 13:
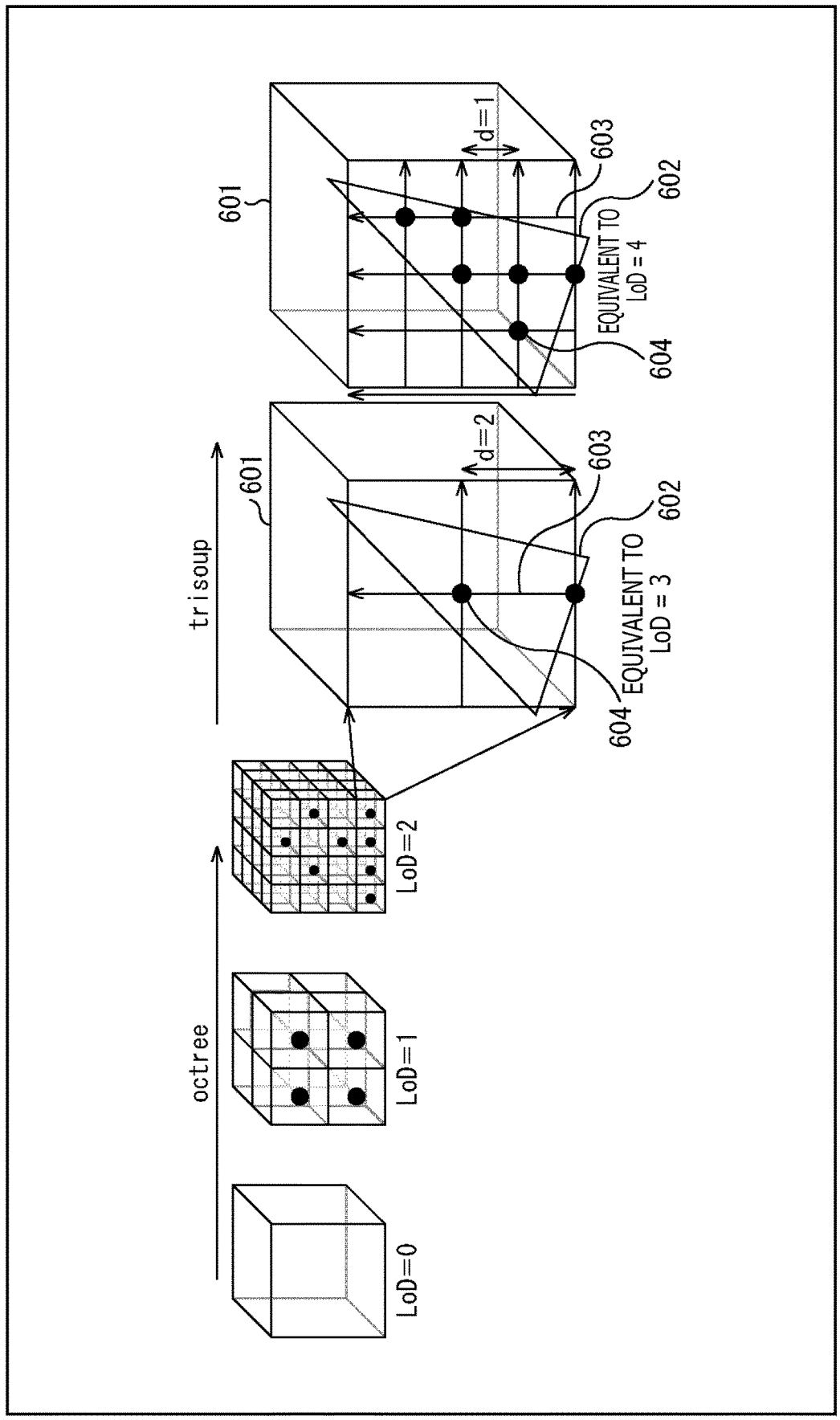
FIG. 13 is a diagram illustrating an example of a manner in which a Triangle soup is made scalable.

For example, as illustrated in FIG. 13, it is assumed that an Octree is applied to layers with lower resolutions (LoD=0 to 2) and that a Triangle soup is applied to layers with higher resolutions. For the layers to which the Octree is applied, the scalability of the resolution can be implemented during decoding (one of the layers in which point cloud data is to be generated is selected on the basis of the different resolutions of the layers).

For the lower layers, the intervals d between the vectors Vi are set such that d=1, and the Triangle soup allows acquisition of point cloud data with a resolution equivalent to LoD=4. For example, in a case of FIG. 13, a voxel 601 equivalent to LoD=2 (rightmost voxel 601 in the figure) contains a triangular surface 602 of a mesh.

Then, vectors Vi 603 are set each of which includes a start origin corresponding to a surface of the voxel 601 and is perpendicular to the surface, the vectors Vi 603 dividing each side of the voxel 601 into four pieces (d=1). In FIG. 13, a reference sign is assigned to only one arrow. However, all arrows in the voxel 601 (including the ends of the voxel 601) correspond to the vectors Vi 603.

Then, points 604 are derived that are located at the intersection points between the surface 602 of the mesh and the vectors Vi 603. In FIG. 13, a reference sign is assigned to only one point. However, all points in the voxel 601 (including the ends of the voxel 601) correspond to the points 604.

This allows acquisition of point cloud data with a resolution equivalent to LoD=4.

In other words, when the vectors Vi are set each of which includes, as a start origin, the position coordinates corresponding to the specified voxel resolution, point cloud data with the final resolution is obtained. The final resolution indicates a predetermined highest resolution. For example, in a case of coding and decoding, the highest resolution indicates the resolution of point cloud data that has not been coded yet by using an Octree, a mesh, or the like.

Here, instead of the above operation, when the intervals d between the vectors Vi 603 are set to d=2 (that is, the intervals between the vectors Vi 603 are doubled), the points 604 (surface 602 and vectors Vi 603) are derived as in a case of the second rightmost voxel 601 in FIG. 13. In other words, point cloud data with a resolution equivalent to LoD=3 is acquired.

Figure 14:
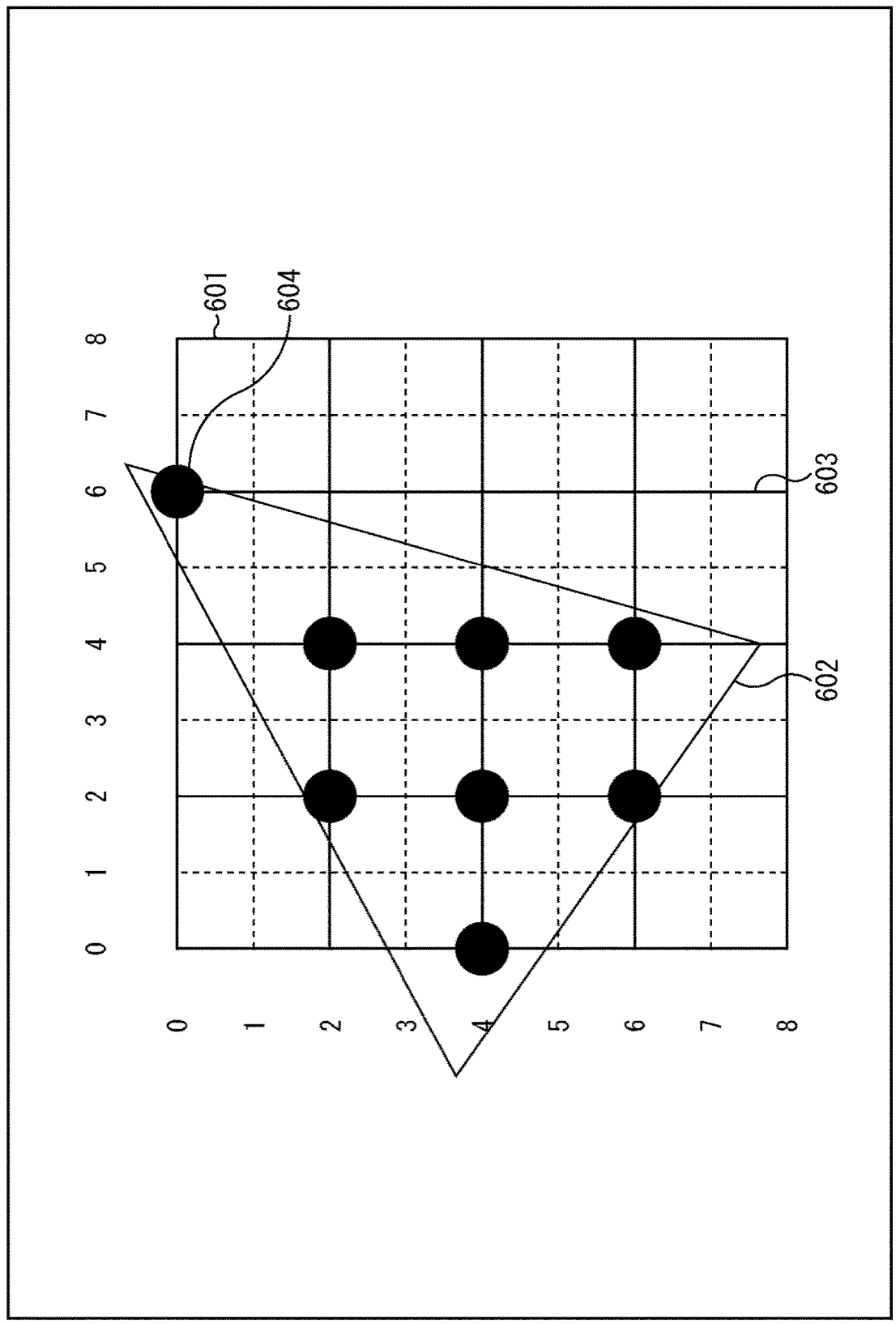
FIG. 14 is a diagram illustrating an example of a manner in which points are generated.

FIG. 14 illustrates the state of the voxel 601 in a plan view for simplification of description. In the voxel 601 (including the ends of the voxel 601), all solid lines and dotted lines parallel to any one of the four sides of the voxel 601 indicate vectors Vi 603 at intervals (d=1) corresponding to the final resolution (for example, LoD=4). Points 604 are derived that are located at the intersection points between the surface 602 of the mesh and the vectors Vi 603.

In FIG. 14, vectors Vi 603 illustrated by solid lines and vectors Vi 603 illustrated by dotted lines are alternately arranged. In other words, the intervals d between the vectors Vi 603 illustrated by solid lines are d=2. In other words, the vectors Vi 603 illustrated by solid lines are the vectors Vi 603 in a layer (for example, LoD=3) immediately above the final resolution. Accordingly, increasing the intervals d reduces the number of the vectors Vi 603, thus reducing the number of the points 604 located at the intersection points. In other words, the resolution of the point cloud data is reduced.

As described above, the intervals d between the vectors Vi enables point cloud data with an optional resolution to be derived. Thus, the resolution of the Triangle soup can be made scalable.

The intervals d between the vectors Vi can be set to an optional value. For example, the intervals d between the vectors Vi may be set to a power of 2. This makes the resolution scalable for each layer of the Octree. In other words, point cloud data can be derived that has a resolution corresponding to each layer of the Octree. For example, assuming that a difference between a desired layer (derived layer) of the Octree and the lowermost layer (layer with the final resolution) is L (L is a non-negative integer), setting $d=2^L$ enables derivation of point cloud data with the resolution corresponding to the desired layer.

Note that L may be a negative value. Setting L to a negative value enables derivation of point cloud data with a resolution higher than the final resolution.

Additionally, the value of the intervals d between the vectors Vi may be a value other than the power of 2. The intervals d between the vectors Vi may be an integer or a decimal as long as the number is positive. For example, when the intervals d between the vectors Vi are set to a value other than the power of 2, point cloud data can be derived that has a resolution other than the resolutions corresponding to the layers of the Octree. For example, when the value of the intervals d between the vectors Vi is set to 3, point cloud data is acquired that has a resolution between LoD=2 and LoD=3.

<Making Position of Start Origin Independent>

For example, in a case of FIG. 14, for both the vectors Vi 603 in the vertical direction in the figure and the vectors Vi 603 in the horizontal direction in the figure, the vectors Vi 603 having identification numbers 0, 2, 4, 6, and 8 illustrated in the figure are adopted as vectors Vi 603 in the layer immediately above. In other words, in the layer immediately above, the vectors Vi 603 having identification numbers 1, 3, 5, and 7 illustrated in the figure (vectors Vi 603 illustrated by dotted lines) are decimated.

As described above, the vectors Vi 603 adopted in the layer immediately above (that is, vectors Vi 603 to be decimated) may be set independently in each direction of the vectors Vi 603 (that is, in each of three axial directions perpendicular to one another (x, y, z directions)). In other words, the positions of the start origins of the vectors Vi 603 may be independent of one another in each of the three axial directions perpendicular to one another (x, y, z directions).

Figure 15:
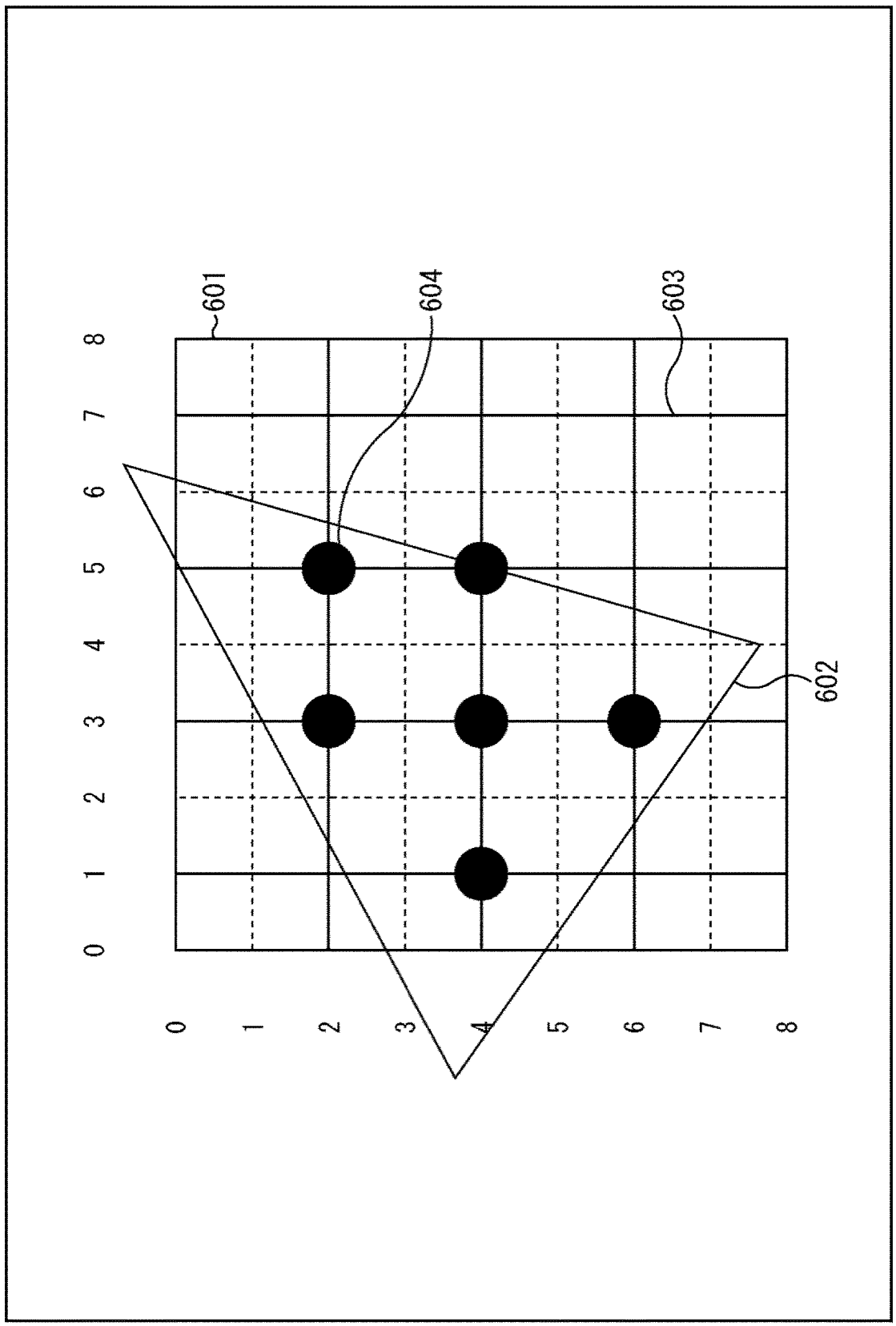
FIG. 15 is a diagram illustrating an example of a manner in which points are generated.

For example, in a case of FIG. 15, for the vectors Vi 603 in the vertical direction in the figure, the vectors Vi 603 having the identification numbers 1, 3, 5, and 7 illustrated in the figure are adopted as vectors Vi 603 in the layer immediately above. In contrast, for the vectors Vi 603 in the horizontal direction in the figure, the vectors Vi 603 having the identification numbers 0, 2, 4, 6, and 8 illustrated in the figure are adopted as vectors Vi 603 in the layer immediately above.

In other words, in the layer immediately above, the vectors Vi 603 arranged in the vertical direction in the figure and having identification numbers 0, 2, 4, 6, and 8 illustrated in the figure (vectors Vi 603 illustrated by dotted lines) are decimated. In contrast, in the layer immediately above, the vectors Vi 603 arranged in the horizontal direction in the figure and having identification numbers 1, 3, 5, and 7 illustrated in the figure (vectors Vi 603 illustrated by dotted lines) are decimated.

This allows the points 604 to be generated at positions different from the positions in a case of FIG. 14 without changing the resolution of the derived point cloud data.

<Making Intervals between Start Origins Independent>

For example, in a case of FIG. 14 and FIG. 15, in the layer immediately above, for both the vectors Vi 603 in the vertical direction in the figure and the vectors Vi 603 in the horizontal direction in the figure, half the vectors are decimated. In other words, the intervals d between the vectors Vi are the same for the vertical and horizontal directions in the figure.

As described above, the number of vectors Vi 603 adopted for the layer immediately above (that is, the vectors Vi 603 to be decimated) may be set independently for each direction of the vectors Vi 603 (that is, for each of the three axial directions perpendicular to one another (the x, y, and z directions)). In other words, the intervals between the start origins of the vectors Vi 603 in the three axial directions perpendicular to one another (x, y, and z directions) may be independent of one another for each of the directions.

Figure 16:
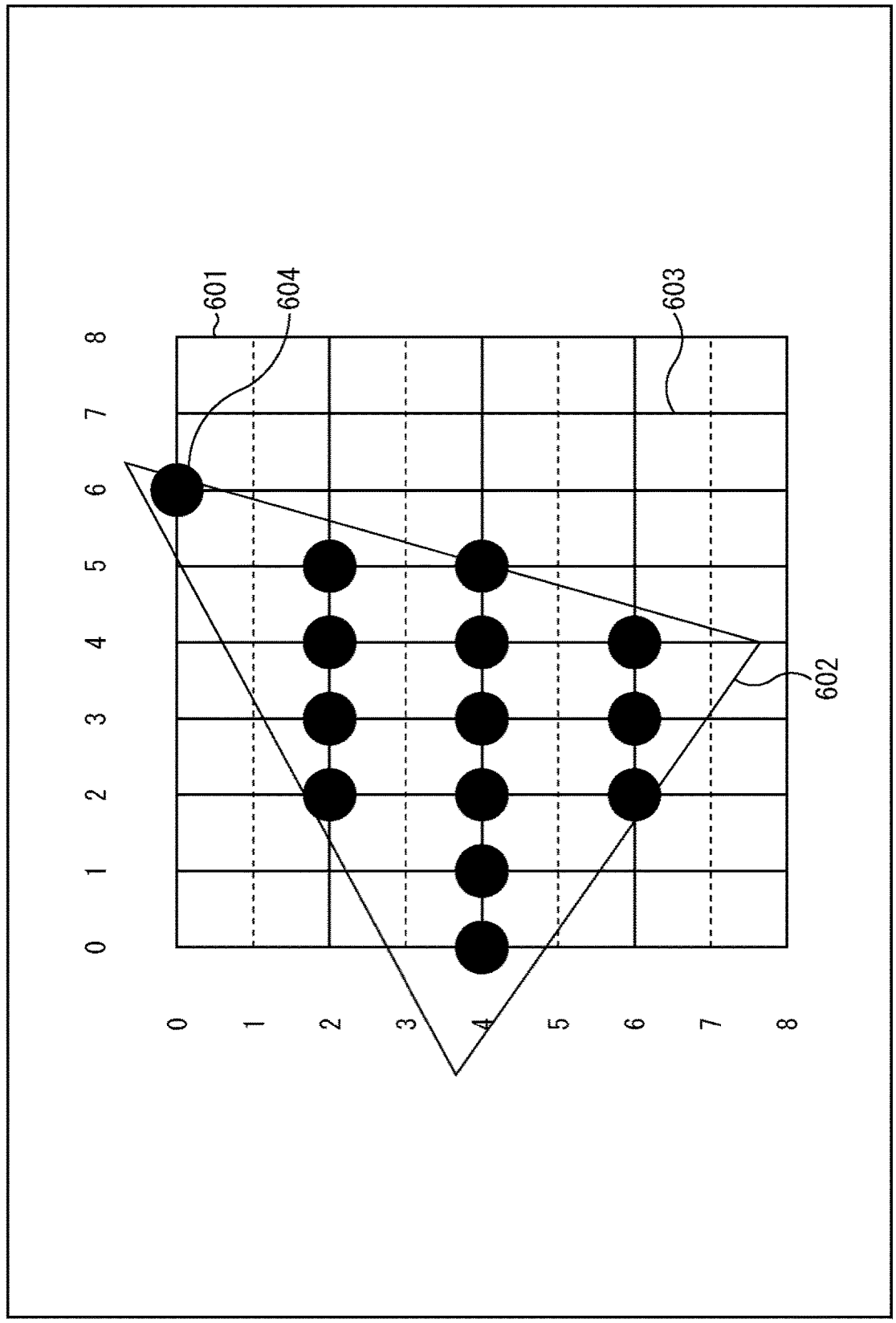
FIG. 16 is a diagram illustrating an example of a manner in which points are generated.

For example, in a case of FIG. 16, assuming that only the vectors Vi 603 illustrated by solid lines are adopted (the vectors Vi 603 illustrated by dotted lines are decimated), for the vectors Vi 603 in the vertical direction in the figure, all the vectors Vi 603 having the identification numbers 0 to 8 are adopted, whereas, for the vectors Vi 603 in the horizontal direction in the figure, only the vectors Vi 603 having the identification numbers 0, 2, 4, 6, and 8 are adopted. In other words, the intervals d between the vectors Vi 603 in the vertical direction in the figure differ from the intervals d between the vectors Vi 603 in the horizontal direction in the figure. Thus, the intervals between the points generated in the vertical direction in the figure differ from the intervals between the points generated in the horizontal direction in the figure. In other words, the resolution of the point cloud data differs between the vertical direction in the figure and the horizontal direction in the figure.

In other words, this enables the resolution of the point cloud data to be set independently for each direction of the vectors Vi 603 (that is, each of the three axial directions perpendicular to one another (x, y, and z directions)).

<Generation of Points at Some of Intersection Points>

Note that points may be generated at some of the intersection points between the surface of the mesh and the vectors Vi. In other words, generation of a point may be omitted even for intersection points. In other words, a reduced resolution of the point cloud may be achieved (that is, the scalability of the resolution may be achieved) by reducing the number of intersection points at which points are generated.

Figure 17:
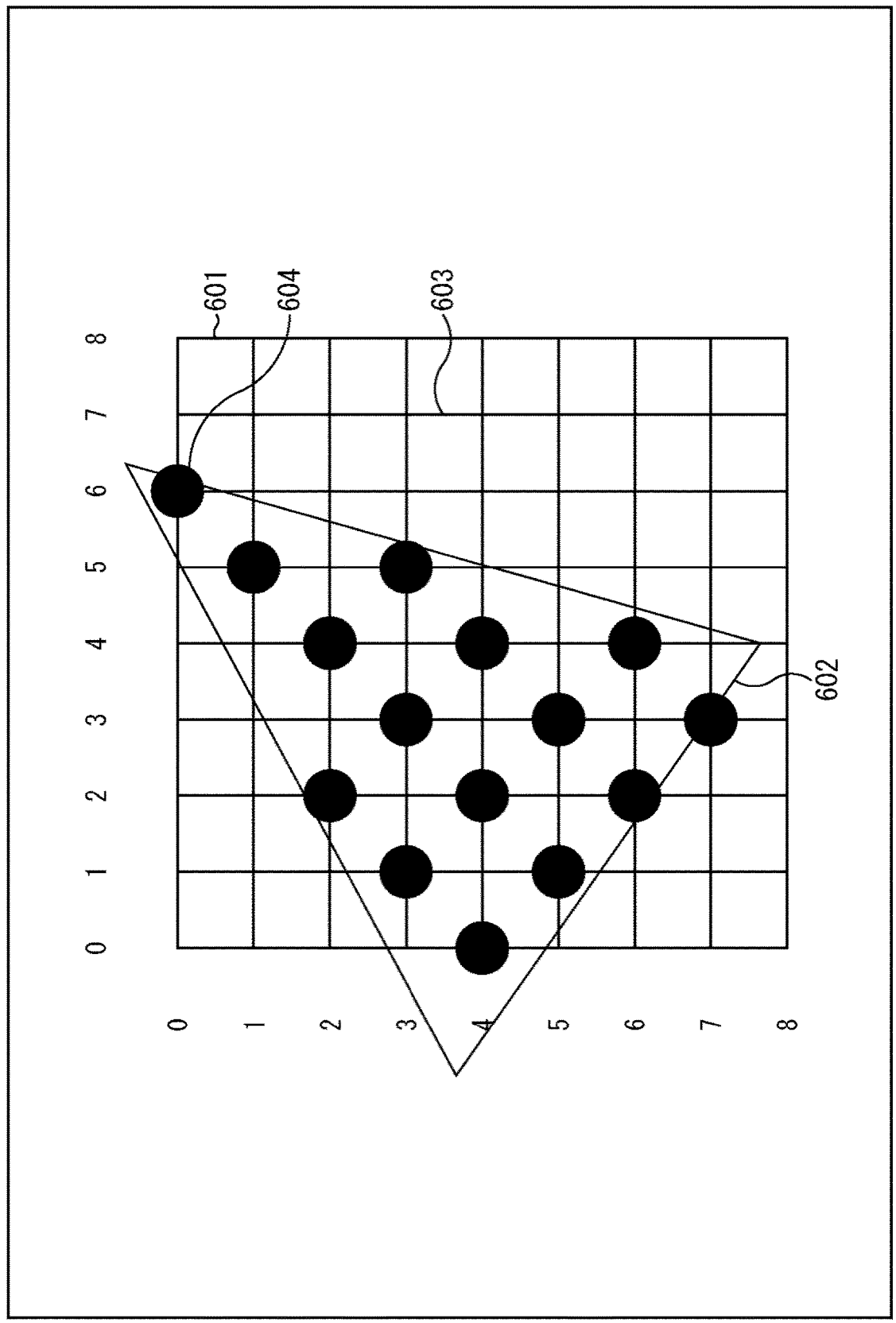
FIG. 17 is a diagram illustrating an example of a manner in which points are generated.

A method for selecting intersection points at which points are to be generated (or points are not to be generated) is optional. For example, as illustrated in FIG. 17, points may be generated in a staggered arrangement (points are generated at every other intersection point for each of the three axial directions).

This enables the scalability of the resolution to be achieved without depending on the intervals between the vectors Vi (or the number of vectors Vi).

<Addition of Points>

Figure 18:
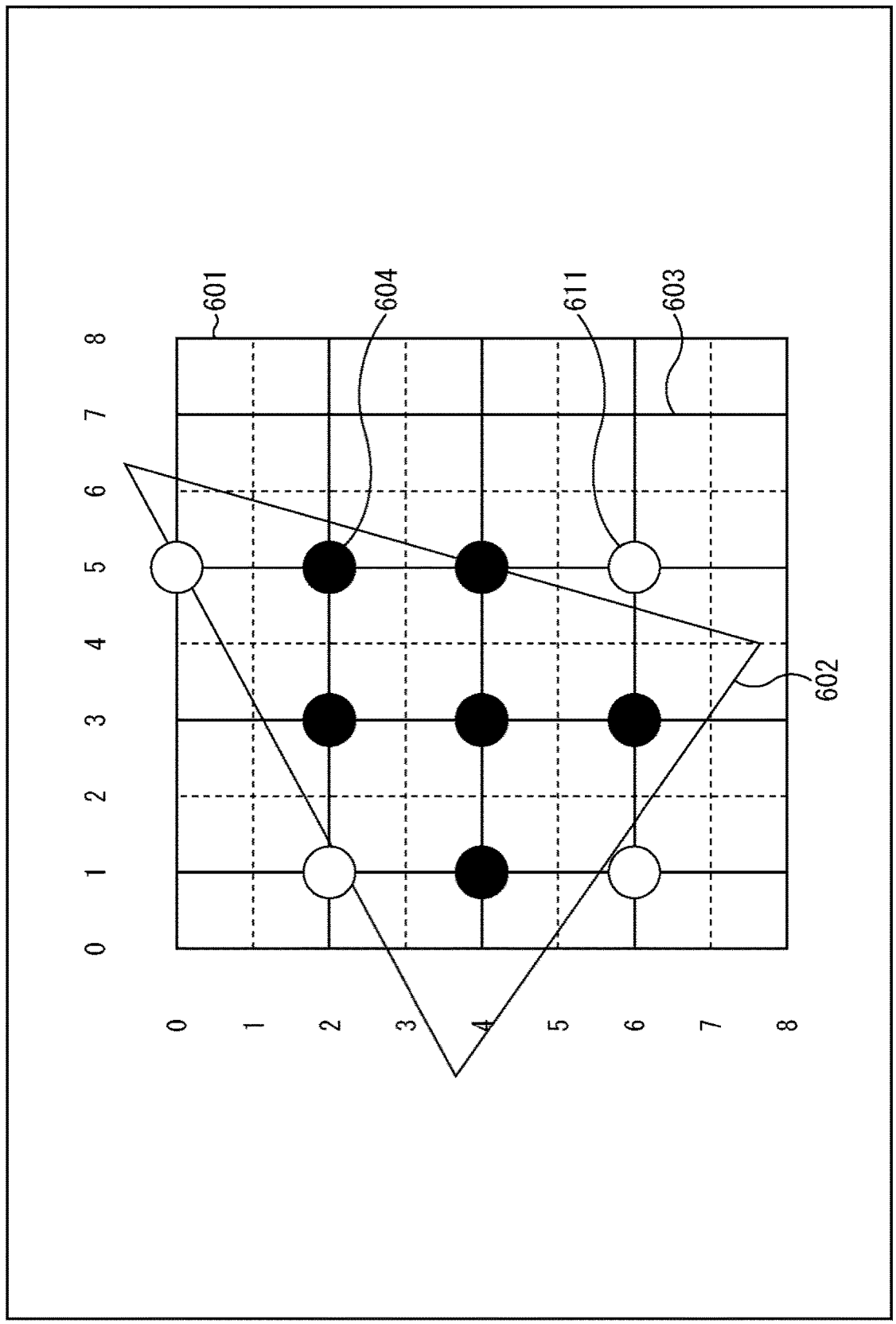
FIG. 18 is a diagram illustrating an example of a manner in which points are generated.

Points not located at the intersection points between the surface of the mesh and the vectors Vi may be generated and included in the point cloud data. For example, as illustrated in FIG. 18, instead of intersection points, points 611 may be generated at positions on vectors Vi that are close to the respective sides of the surface 602 (triangle) of the mesh and may be included in the point cloud data. In FIG. 18, while a reference sign is assigned to only one point, the points illustrated by white circles are all points 611 generated as described above.

Note that a method for determining positions at which points are to be generated (in a case of the example in FIG. 18, a method for determining points close to each side) is optional.

This enables points to be added without depending on the positions of the intersection points, allowing the resolution of a desired portion to be more easily improved. For example, in a case of FIG. 18, points close to each side of the surface 602 are included in the point cloud data to allow the resolution to be made higher around each side of the surface 602 than that in the other areas. This allows the configuration of each side of the surface 602 to be more accurately expressed in the point cloud data. Consequently, a three-dimensional structure expressed by mesh can also be expressed in the point cloud data more accurately.

<Combination>

Any plural number of the techniques described above in the present embodiment can be combined together for application. Additionally, each of the techniques described above in the present embodiment can be combined, for application, with any of the techniques described above in <Generation of Point Cloud>.

<Selection of Method>

Additionally, a desired technique (or a combination of desired techniques) may be selected from among some or all of the techniques described above herein, and then be applied. In that case, a method for selecting the technique is optional. For example, all application patterns may be evaluated, and the best one may be selected. This allows point cloud data to be generated by using a technique most suitable for the three-dimensional structure or the like.

<Application to Point Cloud Generating Apparatus>

Similarly to the techniques described in <1. Generation of Point Cloud>, the techniques described above in the present embodiment can be applied to the point cloud generating apparatus 100 described above in the first embodiment. In that case, the configuration of the point cloud generating apparatus 100 is similar to the configuration in the case described with reference to FIG. 4.

Figure 19:
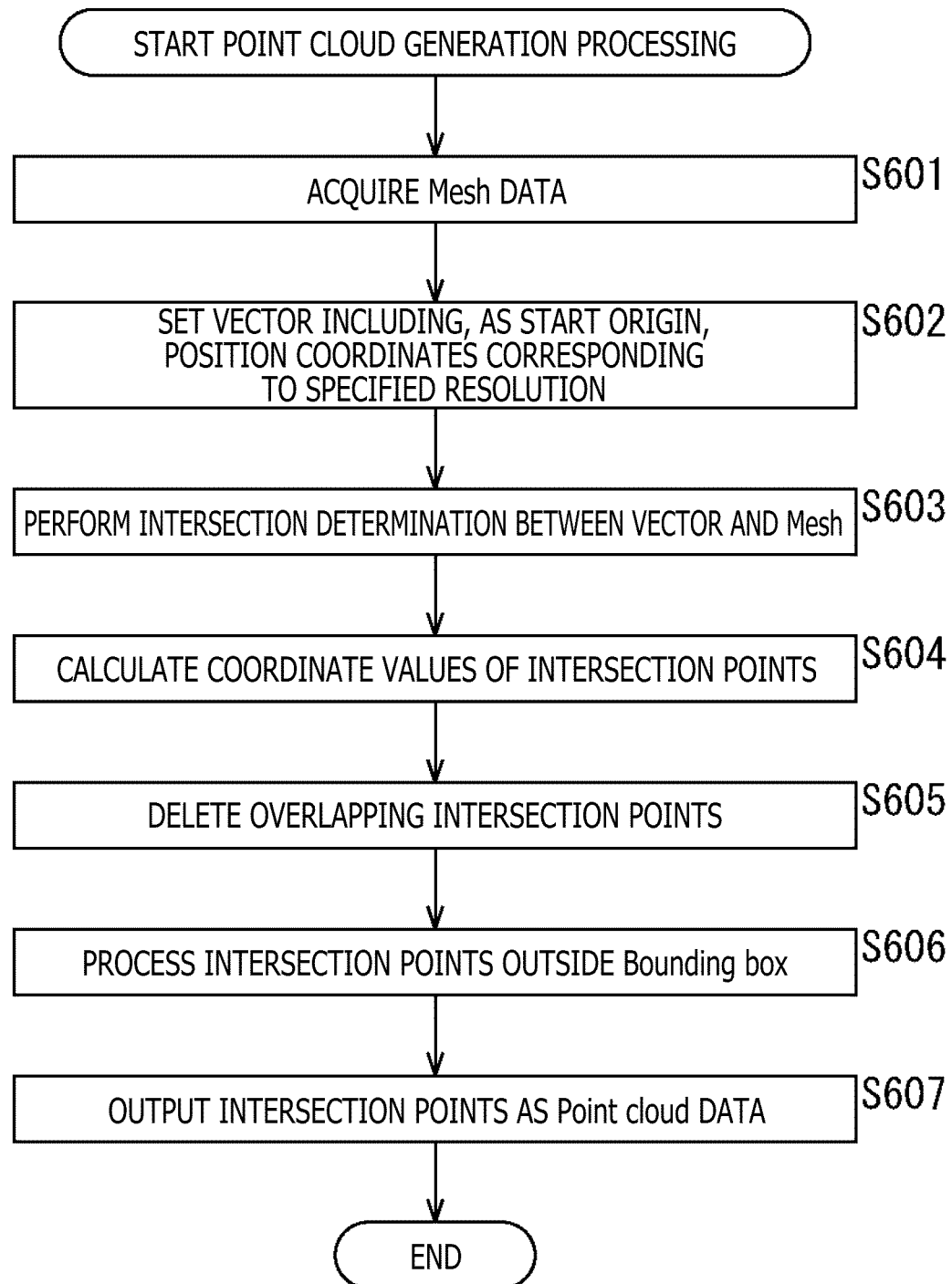
FIG. 19 is a flowchart illustrating an example of a flow of point cloud generation processing.

An example of a flow of point cloud generation processing executed by the point cloud generating apparatus 100 in the above-described case will be described with reference to a flowchart in FIG. 19.

When the point cloud generation processing is started, the intersection determining section 112 acquires mesh data in step S601.

In step S602, the vector setting section 111 sets vectors Vi each including, as a start origin, position coordinates on each surface of a voxel corresponding to a resolution specified by, for example, the user or the like, the vector Vi being perpendicular to each surface of the voxel (parallel to each side of the voxel).

In step S603, the intersection determining section 112 performs intersection determination between a surface (triangle) of a mesh indicated by the mesh data acquired in step S601 and the vectors Vi set in step S602.

Respective steps S604 to S607 of processing are executed similarly to steps S104 to S107 of processing.

When step S607 of processing ends, the point cloud generation processing ends.

Note that the above-described processing is executed, for example, as is the case with the example described above in the present embodiment. Thus, by executing each step of processing described above, the point cloud generating apparatus 100 can produce, for example, effects as described in the present embodiment. For example, voxel data with an optional resolution can be generated from a mesh by executing a single step of processing. In other words, the scalability of the resolution of the point cloud data can be achieved.

In addition, an increase in loads involved in generation of point cloud data can be suppressed. Thus, for example, the point cloud data can be generated at higher speed. Additionally, for example, the manufacturing costs of the point cloud generating apparatus 100 can be reduced.

<Application to Decoding Apparatus>

Additionally, similarly to the techniques described in <1. Generation of Point cloud>, the techniques described above in the present embodiment can be applied to the decoding apparatus 300 described above in the second embodiment. The configuration of the decoding apparatus 300 in that case is similar to the case described with reference to FIG. 9.

The Point cloud generating section 314 is configured similarly to the point cloud generating apparatus 100 described above in the present embodiment, and generates point cloud data from mesh data as described above in the present embodiment.

Thus, the Point cloud generating section 314 can produce effects similar to the effects of the point cloud generating apparatus 100 of the present embodiment. For example, the Point cloud generating section 314 can generate voxel data with an optional resolution from a mesh by executing a single step of processing. In other words, the scalability of the resolution of the point cloud data can be achieved.

In addition, the Point cloud generating section 314 can suppress an increase in loads involved in generation of point cloud data. Thus, the Point cloud generating section 314 can, for example, generate point cloud data at higher speed. Additionally, for example, the manufacturing costs of the Point cloud generating section 314 can be reduced.

Note that, in this case, the Attribute decoding section 315 may decode attribute information in a scalable manner. In other words, for the attribute information, the scalability of the resolution may also be achieved.

Figure 10:
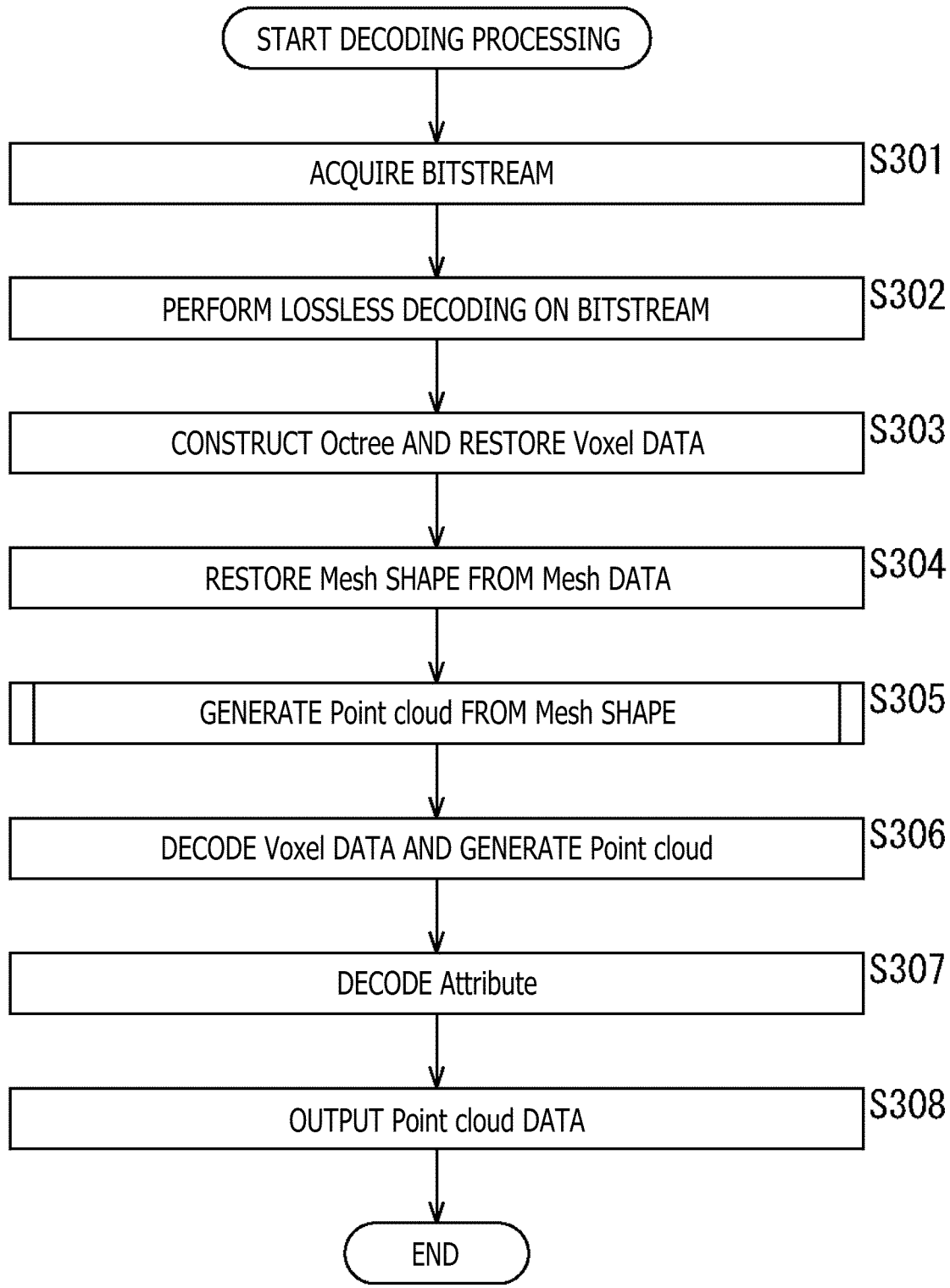
FIG. 10 is a flowchart illustrating an example of a flow of decoding processing.

Additionally, the decoding processing executed by the decoding apparatus 300 in this case is executed according to a flow similar to the flow in the second embodiment (FIG. 10). Consequently, the decoding apparatus 300 can produce effects similar to the effects described above in the present embodiment (for example, similar to the effects of the point cloud generating apparatus 100).

6. Supplementary Feature

<Computer>

The series of steps of processing described above can be executed by hardware or by software. In a case where the series of processing is executed by software, a program constituting the software is installed in a computer. The computer as used herein includes a computer integrated into dedicated hardware, and, for example, a general-purpose computer that can execute various functions when various programs are installed in the computer.

Figure 20:
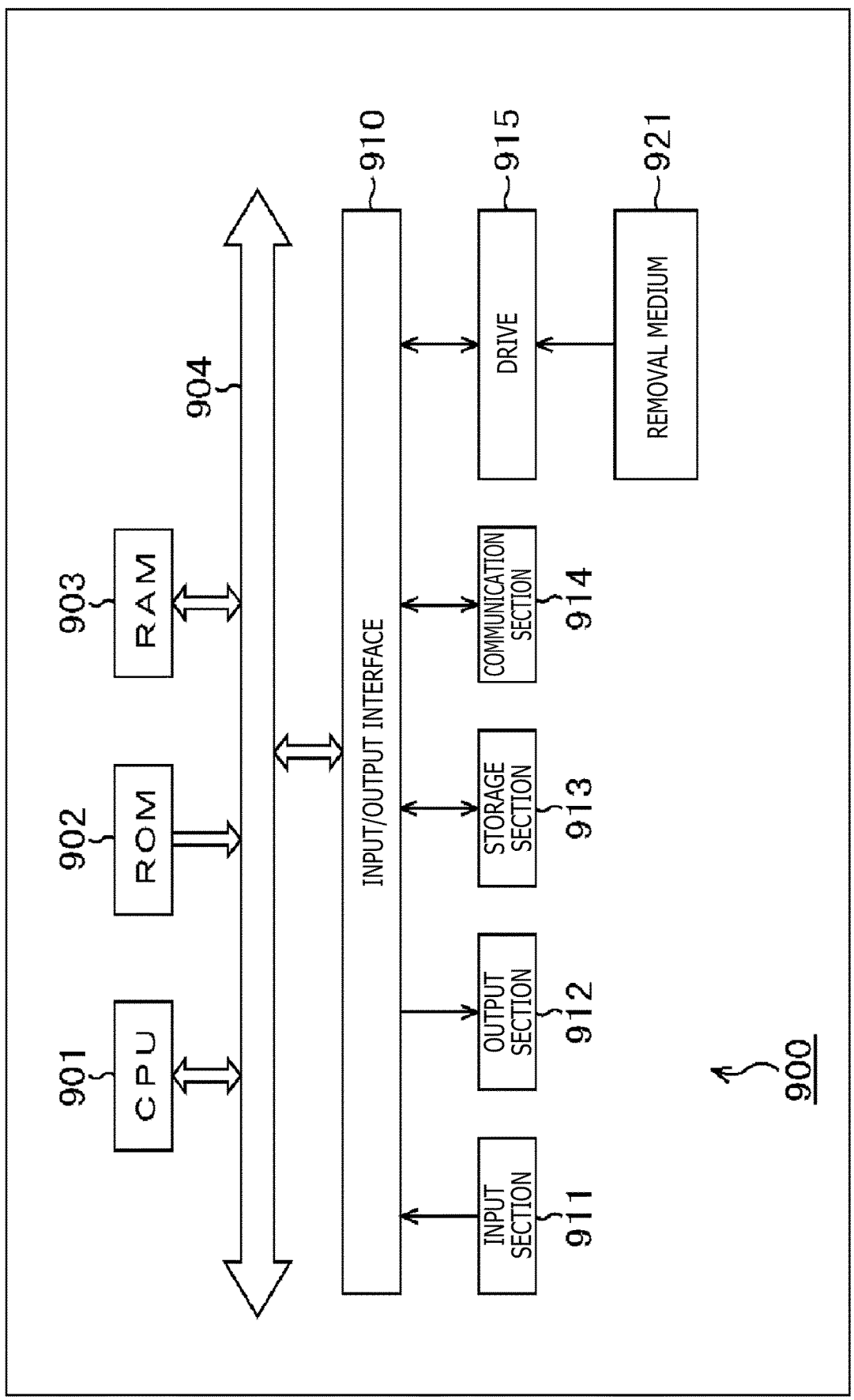
FIG. 20 is a block diagram illustrating an example of a main configuration of a computer.

FIG. 20 is a block diagram illustrating a configuration example of hardware of a computer executing the series of steps of processing described above according to a program.

In a computer 900 illustrated in FIG. 20, a CPU (Central Processing Unit) 901, a ROM (Read Only Memory) 902, and a RAM (Random Access Memory) 903 are connected together via a bus 904.

An input/output interface 910 is also connected to the bus 904. The input/output interface 910 connects to an input section 911, an output section 912, a storage section 913, a communication section 914, and a drive 915.

The input section 911 includes, for example, a keyboard, a mouse, a microphone, a touch panel, an input terminal, and the like. The output section 912 includes, for example, a display, a speaker, an output terminal, and the like. The storage section 913 includes, for example, a hard disk, a RAM disk, a nonvolatile memory, and the like. The communication section 914 includes, for example, a network interface. The drive 915 drives a removable medium 921 such as a magnetic disk, an optical disc, a magneto optical disc, or a semiconductor memory.

In the computer configured as described above, for example, the CPU 901 loads a program stored in the storage section 913, into the RAM 903 via the input/output interface 910 and the bus 904, and executes the program to perform the series of steps of processing described above. The RAM 903 also stores, as appropriate, data or the like required for the CPU 901 to execute various steps of processing.

The program executed by the computer (CPU 901) can be, for example, recorded in the removable medium 921, used as a package medium or the like, for application. In that case, the program can be installed in the storage section 913 via the input/output interface 910 by attaching the removable medium 921 to the drive 915.

Additionally, the program can be provided via a wired or wireless transmission medium such as a local area network, the Internet, or digital satellite broadcasting. In that case, the program can be received by the communication section 914 and installed in the storage section 913.

Besides, the program can be pre-installed in the ROM 902 or the storage section 913.

<Object to which Present Technique Is Applied>

Application of the present technique to coding and decoding of point cloud data has been described. However, the present technique is not limited to these examples and can be applied to coding and decoding of 3D data in conformity with an optional standard. In other words, specifications of various types of processing such as coding and decoding schemes and specifications of various types of data such as 3D data and metadata are optional unless the specifications are inconsistent with the present technique described above. Additionally, part of the above-mentioned processing or the specifications may be omitted unless the omission is inconsistent with the present technique.

The present technique can be applied to an optional configuration. The present technique may be applied to, for example, a transmitter and a receiver (for example, a television receiver and a cellular phone) in wired broadcasting such as satellite broadcasting or cable TV, in distribution on the Internet, in distribution to a terminal through cellular communication, and the like, or may be applied to various types of electronic equipment such as apparatuses (for example, a hard disk recorder and a camera) that record images in media such as an optical disc, a magnetic disk, and a flash memory and that reproduce images from these storage media.

Additionally, the present technique can be implemented as, for example, a partial configuration of an apparatus such as a processor (for example, a video processor) used as a system LSI (Large Scale Integration) or the like, a module (for example, a video module) using a plurality of processors or the like, a unit (for example, a video unit) using a plurality of modules or the like, or a set (for example, a video set) corresponding to a unit with additional functions.

Additionally, the present technique can be applied to, for example, a network system including a plurality of apparatuses. The present technique may be implemented as, for example, cloud computing in which processing is shared and cooperatively executed by a plurality of apparatuses via a network. The present technique may be implemented in, for example, a cloud service that provides services related to images (moving images) to an optional terminal such as a computer, AV (Audio Visual) equipment, a portable information processing terminal, or an IoT (Internet of Things) device.

Note that the system as used herein means a set of a plurality of components (apparatuses, modules (parts), or the like) regardless of whether or not all of the components are present in the same housing. Thus, a plurality of apparatuses housed in separate housings and connected together via a network corresponds to a system, and one apparatus including a plurality of modules housed in one housing also corresponds to a system.

<Fields to which Present Technique can be Applied and Applications of Present Technique>

A system, an apparatus, a processing section, and the like to which the present technique is applied can be utilized in optional fields including, for example, transportation, medical care, crime prevention, agriculture, livestock industry, mining industry, beauty care, factories, home electrical appliances, meteorology, nature surveillance, and the like. Additionally, the present technique can be used for any purposes.

<Miscellaneous>

Note that a "flag" as used herein refers to information for identifying a plurality of states and includes information enabling three or more states to be identified as well as information used to identify two states, that is, true (1) and false (0). Thus, values that may be taken by the "flag" may be, for example, two values of I/O or three or more values. Specifically, any number of bits may constitute the "flag," and the number of bits may be one or plural. Additionally, it is assumed that the identification information (including the flag) is assumed to have a form in which difference information between the identification information and certain information used as a reference is included in a bitstream as well as a form in which the identification information is included in the bitstream. Therefore, the "flag" or the "identification information" as used herein includes not only the information thereof but also the difference information between the information and certain information used as a reference.

Additionally, various types of information (metadata and the like) related to coded data (bitstream) may be transmitted or recorded in any form as long as the information is associated with the coded data. Here, the term "associate" means that, for example, when one piece of data is processed, the other piece of data is made available (can be linked). In other words, data associated with each other may be organized into one piece of data or may be used as separate pieces of data. For example, information associated with coded data (image) may be transmitted on a transmission channel different from a transmission channel on which the coded data (image) is transmitted. Additionally, for example, information associated coded data (image) may be recoded in a recording medium different from a recording medium in which the coded data (image) is recorded (or in a recording area of a recording medium different from a recording area of the same recording medium in which the coded data is recorded). Note that the "association" may be performed on a part of the data rather than on the entire data. For example, an image and information corresponding to the image may be associated with each other in any units such as a plurality of frames, one frame, or portions in a frame.

Note that the terms "synthesize," "multiplex," "add," "integrate," "include," "store," "put into," "plug into," "insert," and the like as used herein mean organizing a plurality of objects into one object, for example, organizing coded data and metadata into one data, and means one method for the "association" described above.

Additionally, embodiments of the present technique are not limited to the embodiments described above and can be variously changed without departing from the spirits of the present technique.

For example, a configuration described as one apparatus (or processing section) may be divided and configured into a plurality of apparatuses (or processing sections). In contrast, configurations described above as a plurality of apparatuses (or processing sections) may be organized or configured into one apparatus (or processing section). Additionally, needless to say, a configuration other than those described above may be added to the configuration of each apparatus (or each processing section). Further, a part of the configuration of one apparatus (or processing section) may be included in the configuration of another apparatus (or another processing section) as long as the configuration and operation of the system as a whole remain substantially the same.

Additionally, for example, the program described above may be executed in an optional apparatus. In that case, it is sufficient that the apparatus includes required functions (functional blocks or the like) and can obtain required information.

Additionally, for example, each step of one flowchart may be executed by one apparatus, or execution of each step may be shared by a plurality of apparatuses. Further, in a case where one step includes a plurality of processes, the plurality of processes may be executed by one apparatus, or execution of the plurality of processes may be shared by a plurality of apparatuses. In other words, a plurality of processes included in one step can be executed as a plurality of steps of the process. In contrast, a process described as a plurality of steps can be organized into a single step for execution.

Additionally, for example, in the program executed by the computer, steps describing the program may be chronologically executed along the order described herein or may be executed in parallel or individually at required timings such as timings when the program is invoked. In other words, the steps of processing may be executed in an order different from the order described above unless the order leads to inconsistency. Further, the steps describing the program may be executed in parallel or combination with processing of another program.

Additionally, for example, a plurality of techniques related to the present technique can be independently and unitarily implemented unless the execution leads to inconsistency. Needless to say, any plural number of the present techniques can be implemented together. For example, a part or all of the present technique described in any one of the embodiments can be implemented in combination with a part or all of the present technique described in another embodiment.

Additionally, a part or all of any of the present techniques described above can be implemented along with another technique not described above.

Note that the present technique can take the following configurations.

(1)

An image processing apparatus including:

a point cloud generating section that generates point cloud data by positioning a point at an intersection point between a surface of a mesh and a vector including, as a start origin, position coordinates corresponding to a specified resolution.

(2)

The image processing apparatus according to (1), in which the point cloud generating section performs intersection determination between the surface and the vector, and in a case of determining that the surface and the vector intersect each other, calculates coordinates of the intersection point.

(3)

The image processing apparatus according to (2), in which the point cloud generating section performs the intersection determination between the surface and the vector in each of positive and negative directions of each of three axial directions perpendicular to one another.

(4)

The image processing apparatus according to (3), in which, in a case where multiple intersection points have overlapping coordinate values, the point cloud generating section deletes all intersection points included in a group of the intersection points overlapping each other, except any one of the intersection points.

(5)

The image processing apparatus according to any one of (2) to (4), in which the point cloud generating section performs the intersection determination between the surface and the vector including the start origin located within a range of each of vertices of the surface.

(6)

The image processing apparatus according to any one of (2) to (5), in which, in a case where the coordinates of the calculated intersection point are outside a bounding box, the point cloud generating section clips the coordinates of the intersection point into the bounding box.

(7)

The image processing apparatus according to any one of (2) to (6), in which, in a case where the coordinates of the calculated intersection point are outside the bounding box, the point cloud generating section deletes the intersection point.

(8)

The image processing apparatus according to any one of (2) to (7), in which the point cloud generating section performs the intersection determination on a portion of the surface relative to the center by using the vector sparser than a vector used in a case of the intersection determination performed on ends of the surface.

(9)

The image processing apparatus according to any one of (2) to (8), in which, in a case where the vector intersects a plurality of the surfaces and where a space is present between the plurality of surfaces, the point cloud generating section adds a point into the space.

(10)

The image processing apparatus according to any one of (2) to (9), in which the point cloud generating section performs the intersection determination on each of a plurality of the vectors with respect to the single surface in parallel.

(11)

The image processing apparatus according to any one of (2) to (10), in which the point cloud generating section performs the intersection determination on each of a plurality of the surfaces with respect to the single vector in parallel.

(12)

The image processing apparatus according to any one of (2) to (11), in which the vector includes, as a start origin, position coordinates corresponding to a specified voxel resolution.

(13)

The image processing apparatus according to any one of (2) to (12), in which the vector includes, as a start origin, position coordinates corresponding to a power of 2 of the specified voxel resolution.

(14)

The image processing apparatus according to any one of (2) to (13), in which positions of start origins of the vectors in three axial directions perpendicular to one another are independent of one another.

(15)

The image processing apparatus according to any one of (2) to (14), in which intervals between the start origins of the vectors in the three axial directions perpendicular to one another are independent of one another.

(16)

The image processing apparatus according to any one of (2) to (15), in which the point cloud generating section includes, in the point cloud data, a point not positioned at the intersection point.

(17)

The image processing apparatus according to any one of (2) to (16), further including:

a mesh shape restoring section that restores a shape of the mesh from voxel data, in which the point cloud generating section generates the point cloud data by using, as a point, the intersection point between the vector and the surface restored by the mesh shape restoring section.

(18)

The image processing apparatus according to (17), further including:

a lossless decoding section that performs lossless decoding on a bitstream to generate Octree data; and an Octree decoding section that generates the voxel data by using the Octree data generated by the lossless decoding section, in which the mesh shape restoring section restores the shape of the mesh from the voxel data generated by the Octree decoding section.

(19)

The image processing apparatus according to (17), further including:

a position information coding section that codes position information in the point cloud data; and an Octree decoding section that generates the voxel data by using Octree data generated when the position information coding section codes the position information.

(20)

An image processing method including:

generating point cloud data by positioning a point at an intersection point between a surface of a mesh and a vector including, as a start origin, position coordinates corresponding to a specified resolution.

REFERENCE SIGNS LIST

100 Point cloud generating apparatus
111 Vector setting section
112 Intersection determining section
113 Auxiliary processing section
114 Output section
300 Decoding apparatus
311 Lossless decoding section
312 Octree decoding section
313 Mesh shape restoring section
314 Point cloud generating section
315 Attribute decoding section
500 Coding apparatus
511 Voxel generating section
512 Geometry coding section
513 Geometry decoding section
514 Attribute coding section 515 Bitstream generating section
521 Octree generating section
522 Mesh generating section
523 Lossless coding section
531 Octree decoding section
532 Mesh shape restoring section
533 Point cloud generating section

The invention claimed is:

1. An image processing apparatus comprising:
circuitry configured to
   set, based on a specified resolution, intervals between vectors in a bounding box defining point cloud data, wherein the vectors each have a same direction as that of a side of the bounding box associated with voxel data of point cloud data, and wherein the voxel data represent voxels in the bounding box,
   define a mesh based on the voxels in the bounding box,
   determine intersections between the vectors and a surface of the mesh, and
   generate the point cloud data by positioning points at respective position coordinates of the intersections,
wherein the circuitry determines the intersections between the vectors and the surface in each of positive and negative directions of each of three axial directions perpendicular to one another, and
wherein, in a case where multiple intersection points have overlapping coordinate values, the circuitry is further configured to delete all intersection points included in a group of the intersection points overlapping each other, except any one of the intersection points.

2. The image processing apparatus according to claim 1, wherein the circuitry determines the intersections between the vectors and the surface including a start origin located within a range of each of vertices of the surface.

3. The image processing apparatus according to claim 1, wherein, in a case where the coordinates of the calculated intersection point are outside a bounding box, the circuitry is further configured to clip the coordinates of the intersection point into the bounding box.

4. The image processing apparatus according to claim 1, wherein, in a case where the coordinates of the calculated intersection point are outside a bounding box, the circuitry is further configured to delete the intersection point.

5. The image processing apparatus according to claim 1, wherein the circuitry determines the intersections on a portion of the surface relative to a center by using one or more vectors sparser than a vector used in a case of the intersection determination performed on ends of the surface.

6. The image processing apparatus according to claim 1, wherein, in a case where the vector intersects a plurality of the surfaces and where a space is present between the plurality of surfaces, the circuitry is further configured to add a point into the space.

7. The image processing apparatus according to claim 1, wherein the circuitry determines the intersections on each of a plurality of the vectors with respect to a single surface in parallel.

8. The image processing apparatus according to claim 1, wherein the circuitry determines the intersections on each of a plurality of surfaces with respect to a single vector in parallel.

9. The image processing apparatus according to claim 1, wherein the vectors include, as a start origin, position coordinates corresponding to a specified voxel resolution.

10. The image processing apparatus according to claim 1, wherein the vectors include, as a start origin, position coordinates corresponding to a power of 2 of a specified voxel resolution.

11. The image processing apparatus according to claim 1, wherein positions of start origins of the vectors in three axial directions perpendicular to one another are independent of one another.

12. The image processing apparatus according to claim 1, wherein intervals between start origins of the vectors in three axial directions perpendicular to one another are independent of one another.

13. The image processing apparatus according to claim 1, wherein the circuitry is further configured to include, in the point cloud data, a point not positioned at the intersection point.

14. The image processing apparatus according to claim 1, wherein the circuitry is further configured to
   perform lossless decoding on a bitstream to generate Octree data, and
   generate the voxel data by using the Octree data generated by the lossless decoding section, and
wherein the circuitry defines the mesh from the voxel data generated by using the Octree data.

15. The image processing apparatus according to claim 1, wherein the circuitry is further configured to
   code position information in the point cloud data, and
   generate the voxel data by using Octree data generated when the circuitry codes the position information.

16. An image processing method comprising:
setting, based on a specified resolution, intervals between vectors in a bounding box defining point cloud data, wherein the vectors each have a same direction as that of a side of the bounding box associated with voxel data of point cloud data, and wherein the voxel data represent voxels in the bounding box;
defining a mesh based on the voxels in the bounding box;
determining intersections between the vectors and a surface of the mesh; and
generating the point cloud data by positioning points at respective position coordinates of the intersections,
wherein the intersections between the vectors and the surface are determined in each of positive and negative directions of each of three axial directions perpendicular to one another, and
wherein, in a case where multiple intersection points have overlapping coordinate values, all intersection points included in a group of the intersection points overlapping each other are deleted, except any one of the intersection points.

* * * * *